US012640132B2

(12) United States Patent
Mok et al.

(10) Patent No.: US 12,640,132 B2
(45) Date of Patent: May 26, 2026

(54) ACOUSTIC ABSORBING FILLER AND RELATED ACOUSTIC ARTICLE

(71) Applicant: 3M INNOVATIVE PROPERTIES COMPANY, St. Paul, MN (US)

(72) Inventors: Michelle M. Mok, St. Paul, MN (US); Nicole D. Petkovich, Little Canada, MN (US); Michael R. Berrigan, Oakdale, MN (US); Yongbeom Seo, Woodbury, MN (US); Andrew J. Hatch, Eagan, MN (US); Kevin A. Frankel, Woodbury, MN (US); Seungkyu Lee, Cupertino, CA (US)

(73) Assignee: 3M Innovative Properties Company, St. Paul, MN (US)

( * ) Notice: Subject to any disclaimer, the term of this patent is extended or adjusted under 35 U.S.C. 154(b) by 340 days.

(21) Appl. No.: 18/044,473

(22) PCT Filed: Sep. 9, 2021

(86) PCT No.: PCT/IB2021/058213
§ 371 (c)(1),
(2) Date: Mar. 8, 2023

(87) PCT Pub. No.: WO2022/053976
PCT Pub. Date: Mar. 17, 2022

(65) Prior Publication Data

US 2023/0326443 A1 Oct. 12, 2023

Related U.S. Application Data

(60) Provisional application No. 63/077,099, filed on Sep. 11, 2020.

(51) Int. Cl.
*G10K 11/165* (2006.01)
*D04H 1/413* (2012.01)
(Continued)

(52) U.S. Cl.
CPC ........... *G10K 11/165* (2013.01); *D04H 1/413* (2013.01); *D04H 1/4291* (2013.01); *D04H 1/56* (2013.01);
(Continued)

(58) Field of Classification Search
CPC .... G10K 11/165; G10K 11/168; D04H 1/413; D04H 1/4291; D04H 1/56; D04H 3/007; D04H 3/16; D06M 11/74; D06M 23/08
(Continued)

(56) References Cited

U.S. PATENT DOCUMENTS

| | | | |
|---|---|---|---|
| 3,971,373 | A | 7/1976 | Braun |
| 4,482,641 | A | 11/1984 | Wennerberg |

(Continued)

FOREIGN PATENT DOCUMENTS

| | | | |
|---|---|---|---|
| DE | 69906883 | T2 | 5/2003 |
| DE | 102013213548 | A1 | 1/2015 |

(Continued)

OTHER PUBLICATIONS

Davies, "The Separation of Airborne Dust and Particles", Proceedings of the Institution of Mechanical Engineers, Jun. 1953, vol. 167, No. 1B, pp. 185-213.

(Continued)

*Primary Examiner* — Jeremy A Luks
(74) *Attorney, Agent, or Firm* — Carlos M. Téllez Rodríguez; 3M Innovative Properties Company

(57) ABSTRACT

An acoustic absorbing filler, the acoustic absorbing filler comprising agglomerates comprising a first phase comprising a plurality of porous particulates and a second phase comprising a binder; wherein the acoustic absorbing filler has a median sieved particle size of from 100 micrometer to 700 micrometers and a specific surface area of from 50 $m^2/g$ to 900 $m^2/g$; wherein the acoustic absorbing filler has a
(Continued)

normal incidence acoustic absorption of no less than 0.20 alpha at 400 Hz.

16 Claims, 1 Drawing Sheet

(51) Int. Cl.

| | |
|---|---|
| ***D04H 1/4291*** | (2012.01) |
| ***D04H 1/56*** | (2006.01) |
| ***D04H 3/007*** | (2012.01) |
| ***D04H 3/16*** | (2006.01) |
| ***D06M 11/74*** | (2006.01) |
| ***D06M 23/08*** | (2006.01) |
| ***D06M 101/20*** | (2006.01) |
| ***G10K 11/168*** | (2006.01) |

(52) U.S. Cl.
CPC ............... *D04H 3/007* (2013.01); *D04H 3/16* (2013.01); *D06M 11/74* (2013.01); *D06M 23/08* (2013.01); *G10K 11/168* (2013.01); *D06M 2101/20* (2013.01); *D10B 2321/022* (2013.01)

(58) Field of Classification Search
USPC ......................................... 181/290, 294, 295
See application file for complete search history.

(56) References Cited

U.S. PATENT DOCUMENTS

| | | | | |
|---|---|---|---|---|
| 4,657,108 | A | 4/1987 | Ward | |
| 4,677,086 | A | 6/1987 | Mccue et al. | |
| 4,857,243 | A | 8/1989 | Von Blucher et al. | |
| 4,954,469 | A | 9/1990 | Robinson | |
| 4,999,330 | A | 3/1991 | Bose et al. | |
| 5,304,415 | A | 4/1994 | Kurihara et al. | |
| 5,332,426 | A | 7/1994 | Tang et al. | |
| 5,488,021 | A | 1/1996 | Deliso et al. | |
| 5,639,550 | A | 6/1997 | Lisenko et al. | |
| 5,736,485 | A | 4/1998 | Miller | |
| 6,277,179 | B1 | 8/2001 | Reymonet | |
| 6,617,002 | B2 | 9/2003 | Wood | |
| 6,764,601 | B1 | 7/2004 | Levy et al. | |
| 6,780,350 | B1 | 8/2004 | Kodas et al. | |
| 6,977,109 | B1 | 12/2005 | Wood | |
| 7,279,440 | B2 | 10/2007 | Berrigan et al. | |
| 7,293,661 | B2 | 11/2007 | Saaski et al. | |
| 7,497,509 | B2 * | 3/2009 | Omiya | B60R 13/0861 428/113 |
| 7,731,878 | B2 | 6/2010 | Wood | |
| 7,740,141 | B2 | 6/2010 | Reid et al. | |
| 7,743,880 | B2 | 6/2010 | Matsumura et al. | |
| 7,918,313 | B2 | 4/2011 | Gross et al. | |
| 8,058,201 | B2 | 11/2011 | Martinez et al. | |
| 8,759,250 | B2 | 6/2014 | Robinson et al. | |
| 8,906,815 | B2 | 12/2014 | Moore et al. | |
| 9,767,782 | B2 * | 9/2017 | Takeda | B60R 13/08 |
| 2006/0118355 | A1 * | 6/2006 | Blomeling | B29C 67/205 181/294 |
| 2006/0154815 | A1 | 7/2006 | Abe et al. | |
| 2006/0163151 | A1 | 7/2006 | Kawasaki et al. | |
| 2008/0029337 | A1 * | 2/2008 | Alston | B60R 13/08 181/294 |
| 2008/0038976 | A1 | 2/2008 | Berrigan et al. | |
| 2012/0305467 | A1 | 12/2012 | Giebelhausen et al. | |
| 2016/0298266 | A1 | 10/2016 | Zillig et al. | |
| 2017/0061948 | A1 * | 3/2017 | Guzman | B32B 27/306 |
| 2017/0132999 | A1 * | 5/2017 | Coakley | G10K 11/172 |
| 2020/0055293 | A1 | 2/2020 | Ogawa et al. | |
| 2020/0223171 | A1 | 7/2020 | Stecenko et al. | |

FOREIGN PATENT DOCUMENTS

| | | | | |
|---|---|---|---|---|
| EP | 0607636 | A2 | 7/1994 | |
| EP | 2549474 | A1 * | 1/2013 | G10K 11/168 |
| JP | 2005338129 | A | 12/2005 | |
| JP | 2015197662 | A | 11/2015 | |
| WO | WO-2009088648 | A1 * | 7/2009 | D04H 1/407 |
| WO | WO-2010012900 | A2 * | 2/2010 | B64D 33/02 |
| WO | WO-2014184205 | A1 * | 11/2014 | B32B 13/047 |
| WO | WO-2019079695 | A1 * | 4/2019 | B32B 27/20 |
| WO | 2020217131 | A1 | 10/2020 | |

OTHER PUBLICATIONS

International Search Report for PCT Application No. PCT/IB2021/058213, mailed on Nov. 29, 2021, 5 pages.

Venegas, "Influence of Sorption on Sound Propagation in Granular Activated Carbon", 2016, The Journal of the Acoustical Society of America, vol. 140, No. 2, pp. 755-766.

Wente, "Manufacture of Superfine Organic Fibers" Naval Research Laboratories Report No. 4364 (111437), May 1954, 19 pages.

Wente, "Superfine Thermoplastic Fibers", Industrial and Engineering Chemistry, Aug. 1956, vol. 48, No. 8, pp. 1342-1346.

* cited by examiner

ACOUSTIC ABSORBING FILLER AND RELATED ACOUSTIC ARTICLE

CROSS REFERENCE TO RELATED APPLICATIONS

This application is a national stage filing under 35 U.S.C. 371 of PCT/IB2021/058213, filed Sep. 9, 2021, which claims the benefit of U.S. Provisional Patent Application No. 63/077,099, filed Sep. 11, 2020, the disclosure of which is incorporated by reference in its/their entirety herein.

BACKGROUND

Historically, developments in automotive and aerospace technology have been driven by consumer demands for faster, safer, quieter, and more spacious vehicles. These attributes must be counterbalanced against the desire for fuel economy, since enhancements to these consumer-driven attributes generally also increase the weight of the vehicle.

With a 10% weight reduction in the vehicle capable of providing about an 8% increase in fuel efficiency, automotive and aerospace manufacturers have a great incentive to decrease vehicle weight while meeting existing performance targets. Yet, as vehicular structures become lighter, noise can become increasingly problematic. Some noise is borne from structural vibrations, which generate sound energy that propagates and transmits to the air, generating airborne noise. Structural vibration is conventionally controlled using damping materials made with heavy, viscous materials. Airborne noise is conventionally controlled using a soft, pliable material, such as a fiber or foam, capable of absorbing sound energy.

SUMMARY

Thus, in one aspect, the present disclosure provides an acoustic absorbing filler, the acoustic absorbing filler comprising agglomerates comprising a first phase comprising a plurality of porous particulates and a second phase comprising a binder; wherein the acoustic absorbing filler has a median sieved particle size of from 100 micrometer to 700 micrometers and a specific surface area of from 50 $m^2/g$ to 900 $m^2/g$; wherein the acoustic absorbing filler has a normal incidence acoustic absorption of no less than 0.20 alpha at 400 Hz.

In another aspect, the present disclosure provides an acoustic article comprising: a porous layer; and the acoustic absorbing filler of the present disclosure at least partially enmeshed in the porous layer, wherein the acoustic article has a flow resistance of from 1000 MKS Rayls to 10,000 MKS Rayls.

In another aspect, the present disclosure provides a method of making an acoustic article comprising: partially enmeshing acoustic absorbing filler of the present disclosure into a porous layer, the acoustic absorbing filler having an specific surface area of from 50 $m^2/g$ to 900 $m^2/g$ to increase acoustic absorption of the article for sound frequencies below 1000 Hz.

Various aspects and advantages of exemplary embodiments of the present disclosure have been summarized. The above Summary is not intended to describe each illustrated embodiment or every implementation of the present disclosure. Further features and advantages are disclosed in the embodiments that follow. The Drawings and the Detailed Description that follow more particularly exemplify certain embodiments using the principles disclosed herein.

Definitions

For the following defined terms, these definitions shall be applied for the entire Specification, including the claims, unless a different definition is provided in the claims or elsewhere in the Specification based upon a specific reference to a modification of a term used in the following definitions:

The terms "about" or "approximately" with reference to a numerical value or a shape means+/− five percent of the numerical value or property or characteristic, but also expressly includes any narrow range within the +/−five percent of the numerical value or property or characteristic as well as the exact numerical value. For example, a temperature of "about" 100° C. refers to a temperature from 95° C. to 105° C., but also expressly includes any narrower range of temperature or even a single temperature within that range, including, for example, a temperature of exactly 100° C. For example, a viscosity of "about" 1 Pa-sec refers to a viscosity from 0.95 to 1.05 Pa-sec, but also expressly includes a viscosity of exactly 1 Pa-sec. Similarly, a perimeter that is "substantially square" is intended to describe a geometric shape having four lateral edges in which each lateral edge has a length which is from 95% to 105% of the length of any other lateral edge, but which also includes a geometric shape in which each lateral edge has exactly the same length.

The terms "a", "an", and "the" include plural referents unless the content clearly dictates otherwise. Thus, for example, reference to a material containing "a compound" includes a mixture of two or more compounds.

"Average" means number average, unless otherwise specified.

"Basis Weight" is calculated as the weight of a 10 cm×10 cm web sample multiplied by 100, and is expressed in grams per square meter (gsm).

"Copolymer" refers to polymers made from repeat units of two or more different polymers and includes random or statistical, gradient, alternating, block, graft, and star (e.g. dendritic) copolymers and combinations thereof.

"Dimensionally stable" refers to a structure that substantially holds its shape under gravity unassisted (i.e., not floppy).

"Die" means a processing assembly including at least one orifice for use in polymer melt processing and fiber extrusion processes, including but not limited to melt-blowing.

"Enmeshed" means that particles are dispersed and physically and/or adhesively held in the fibers or structure of the web.

"Glass transition temperature (or $T_g$)" of a polymer refers to a temperature at which there is a reversible transition in an amorphous polymer (or in an amorphous region within a semi crystalline polymer) from a hard and relatively brittle "glassy" state into a viscous, rubbery (elastic), or viscoelastic state as the temperature is increased.

"Median fiber diameter" of fibers in a non-woven fibrous layer is determined by producing one or more images of the fiber structure, such as by using a scanning electron microscope; measuring the transverse dimension of clearly visible fibers in the one or more images resulting in a total number of fiber diameters; and calculating the median fiber diameter based on that total number of fiber diameters.

"Non-woven fibrous layer" means a plurality of fibers characterized by entanglement or point bonding of the fibers to form a sheet or mat exhibiting a structure of individual fibers or filaments which are interlaid, but not in an identifiable manner as in a knitted or woven fabric.

"Oriented" when used with respect to a fiber means that at least portions of the polymer molecules within the fiber are aligned with the longitudinal axis of the fiber, for example, by use of a drawing (or stretching) process or attenuator upon a stream of fibers exiting from a die.

"Particle" or "particulate" refers to a small distinct piece or individual part of a material in finely divided form. A particle may also include a collection of individual particles associated or clustered together in finely divided form. Thus, individual particulates used in certain exemplary embodiments of the present disclosure may clump, physically intermesh, electrostatically associate, or otherwise associate to form clustered or agglomerated particulates. In certain instances, particulates in the form of agglomerates of individual particulates may be formed as described in U.S. Pat. No. 5,332,426 (Tang et al).

"Polymer" means a relatively high molecular weight material having a molecular weight of at least 2,000 g/mol or more than 20 repeat units.

"Porous" means air-permeable.

"Shrinkage" means reduction in the dimension of a fibrous non-woven layer after being heated to 150° C. for 7 days based on the test method described in U.S. Patent Publication No. 2016/0298266 (Zillig et al.).

"Size" refers to the longest dimension of a given object or surface.

"Substantially" means a majority of, or mostly, as in an amount of at least 50%, 60, 70, 80, 90, 95, 96, 97, 98, 99, 99.5, 99.9, 99.99, or 99.999%, or 100%.

"Surface area" refers to the specific surface area, unless noted otherwise. This quantity for a material is the surface area normalized by unit mass.

BRIEF DESCRIPTION OF THE DRAWINGS

The disclosure may be more completely understood in consideration of the following detailed description of various embodiments of the disclosure in connection with the accompanying figures, in which.

Figure 1:
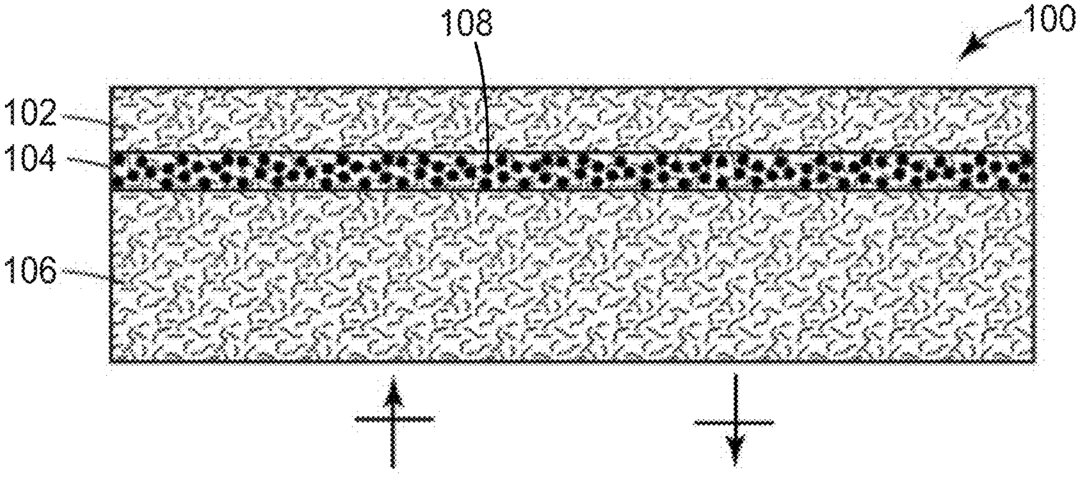
FIG. 1 is side cross-sectional view of an acoustic article according to an embodiment.

While the above-identified drawings, which may not be drawn to scale, set forth various embodiments of the present disclosure, other embodiments are also contemplated, as noted in the Detailed Description. In all cases, this disclosure describes the presently disclosed invention by way of representation of exemplary embodiments and not by express limitations. It should be understood that numerous other modifications and embodiments can be devised by those skilled in the art, which fall within the scope and spirit of this disclosure.

DETAILED DESCRIPTION

Before any embodiments of the present disclosure are explained in detail, it is understood that the invention is not limited in its application to the details of use, construction, and the arrangement of components set forth in the following description. The invention is capable of other embodiments and of being practiced or of being carried out in various ways that will become apparent to a person of ordinary skill in the art upon reading the present disclosure. Also, it is understood that the phraseology and terminology used herein is for the purpose of description and should not be regarded as limiting. The use of "including," "comprising," or "having" and variations thereof herein is meant to encompass the items listed thereafter and equivalents thereof as well as additional items. It is understood that other embodiments may be utilized and structural or logical changes may be made without departing from the scope of the present disclosure.

As used in this Specification, the recitation of numerical ranges by endpoints includes all numbers subsumed within that range (e.g. 1 to 5 includes 1, 1.5, 2, 2.75, 3, 3.8, 4, and 5, and the like).

Unless otherwise indicated, all numbers expressing quantities or ingredients, measurement of properties and so forth used in the Specification and embodiments are to be understood as being modified in all instances by the term "about." Accordingly, unless indicated to the contrary, the numerical parameters set forth in the foregoing specification and attached listing of embodiments can vary depending upon the desired properties sought to be obtained by those skilled in the art utilizing the teachings of the present disclosure. At the very least, and not as an attempt to limit the application of the doctrine of equivalents to the scope of the claimed embodiments, each numerical parameter should at least be construed in light of the number of reported significant digits and by applying ordinary rounding techniques.

The present disclosure is directed to acoustic absorbing fillers, acoustic articles, assemblies, and methods thereof that function as acoustic absorbers, vibration dampeners, and/or acoustic and thermal insulators. The acoustic articles and assemblies generally include one or more porous layers and one or more acoustic absorbing fillers in contact with the one or more porous layers. Optionally, the provided acoustic articles and assemblies include one or more non-porous barrier layers and/or air gaps adjacent to the one or more porous layers. Structural and functional characteristics of each of these components are described in the subsections that follow.

Acoustic Absorbing Fillers

The acoustic absorbing filler includes agglomerates comprising a first phase comprising a plurality of porous particulates, which may be characterized by open pores, and a second phase comprising a binder. In some embodiments, the first phase of porous particulates is discontinuous. In some embodiments, the second phase of the binder is continuous. The porous particulates can be agglomerated (i.e., aggregated) into larger particles. Porous particulates may be aggregated to each other by particle-to-particle interactions. Such interactions can be mediated by intermolecular forces such as dispersion forces or electrostatic forces, and/or by additional intramolecular bonding with some degree of covalent character. Aggregation of porous particulates may be achieved by first drawing the particulates and binder together via the capillary action of a fluid that is subsequently removed through drying. Enhanced mechanical stability can be achieved by using adhesive properties present in the binder phase that may or may not be activated via an energetic input (heat, UV light, etc.). Additionally, another chemical species may be employed to either catalyze a reaction leading to enhanced adhesive properties or to serve as a reactant in a reaction (or sequence of reactions) that improves adhesion. In some embodiments, at least some of the porous particulates are sintered together with the binder under slight pressure and/or heat to form agglomerates. The heat may be provided using any known method, including steam, high-frequency radiation, infrared radiation, or heated air.

Porous particulate aggregates may be regularly or irregularly shaped. Preferably, aggregates stay together in intended use (are mechanically stable or robust) with most particles retaining their specified dimensions but are not necessarily "crushproof." In that regard certain binder compounds, for instance clay and/or soluble alkali silicates, can be beneficial to use in these acoustic absorbing fillers.

Porous particulates that have open pores with diameters on the nanoscale include zeolites, colloidal or molecular condensed sol-gel materials (e.g. xerogels or aerogels), aluminophosphates, porous alumina, mica, perlite, granulated polyurethane foam particles, soft and hard templated materials, polymers of intrinsic microporosity, ion exchange resins, layered compounds, dendrimers, metal organic frameworks (MOFs), layered silicates, layered double hydroxides, graphite oxide, inorganic nanotubes, porous divinylbenzene copolymers, etched block-co-polymers, many types of biomass, and porous carbon materials.

The binder can include any suitable binder. In at least one embodiment, the binder can be a composition selected from clay particles, polyolefins, halogenated polyolefins, polyacrylates, acrylic-copolymers, polyvinylpyrrolidone, polyvinyl alcohol, acrylamides, stryenic polymers, polyurethanes, butadiene co-polymer, polyethylene glycol, polyethylene oxide, neoprene, cellulosics, biopolymers and combinations thereof. In at least one embodiment, the binder can contain diatomaceous earth, biologically-derived filler, non-layered silicates, and unexpanded graphite, which are materials that occupy space, but do not necessarily act to adhere components of the filler together. In at least one embodiment, the binder can be a liquid alkali silicate or solid powdered alkali silicate. In at least one embodiment, the binder can be a latex. In at least one embodiment, the binder can be a formaldehyde-based thermosetting resin. In at least one embodiment, the binder can be a pitch. In some embodiments, the binder does not include microporous particulate materials. In some embodiments, the binder has a specific surface area less than 50 $m^2/g$. In at least one embodiment, the binder can be heat activated to deform and form cohesive networks between particles on cooling, for example, polyolefins, halogenated polyolefins, polyacrylates, acrylic-copolymers, stryenic polymers, polyurethanes, butadiene copolymer, or neoprene.

The acoustic absorbing filler may be present in various configurations relative to the porous layer. Where the porous layer is a non-woven fibrous layer, open-celled foam, or particulate bed, for example, the acoustic absorbing filler may be embedded in the non-woven fibrous layer, open-celled foam, or particulate bed. Where the porous layer includes a perforated film, the acoustic absorbing filler may reside, at least in part, within the plurality of apertures extending through the perforated film. In some embodiments, at least 5%, at least 10%, at least 20%, at least 30%, at least 40%, at least 50%, at least 60%, at least 70%, at least 80%, at least 90%, or at least 95% of the acoustic absorbing filler contacting the porous layer resides within the plurality of apertures. Alternatively, the acoustic absorbing filler may be present as a discrete layer adjacent to the porous layer.

The porous particles can include mesopores (having a diameter less than 50 nanometers but greater than 2 nanometers), micropores (having a diameter less than 2 nanometers), and/or combinations of the above. In some embodiments, the mesopore particulates have an average pore diameter under 30 nm. Acoustic absorbing fillers that exemplify these features include porous carbon particles. Porous carbon particles include activated carbon, vermiform carbon, coal, carbonized biomass, carbonized organic polymeric materials, or mixtures thereof.

Activated carbon is a highly porous carbonaceous material having a complex structure composed primarily of carbon atoms. The activation process can be carried out using steam and/or $CO_2$ at high temperatures around 1000° C. (a process called physical activation), or in some cases using phosphoric acid or other compounds like potassium hydroxide or zinc-based compounds at lower temperatures (a process called chemical activation). The pores in activated carbons are from pre-existing channels and new channels oxidized within carbon with nanoscale (graphite-like) regions of SP2 bonding alongside disordered SP3 carbon. This creates a highly porous structure arising from a multiplicity of pits and fissures within the solid carbon framework.

One remarkable feature of activated carbon is its ability to adsorb significant quantities of gas molecules. This arises, in large part, due to the high surface area of the pores within the material, which is typically on the order of the area of a football pitch (7140 $m^2$) for less than ten grams of material. The behavior of porous carbon within enclosed spaces, such as cavities in loudspeakers, has been consistent with adsorption of ambient air molecules altering the overall acoustic response. When porous carbon adsorbs air molecules within a confined space, the effective air volume can be over two times the air volume in the same space without porous carbon. By expanding the effective air volume within an acoustic cavity, porous carbon tends to shift the acoustic resonance to lower frequencies (a phenomenon often call bass shifting). In the art, an analogous phenomenon involving the high adsorption capacity of activated carbon is thought to be operative in nonconfined acoustic absorbing articles (Venegas, The Journal of the Acoustical Society of America 140, 755 (2016)). This frequency shift in the onset of absorption can be interpreted as shortening of the quarter wavelength of the acoustic absorption (or slowing down of speed of sound in the acoustic medium), thus providing for enhanced low-frequency acoustic performance in a thinner layer than conventional absorbers.

The acoustic absorbing filler has a median sieved particle size of from 100 micrometers to 2000 micrometers, from 100 micrometers to 1000 micrometers, from 100 micrometers to 900 micrometers, or from 100 micrometer to 700 micrometers, or in some embodiments, less than, equal to, or greater than 100, 200, 300, 400, 500, 600, 700, 800, 900, 1000, 1200, 1500, 1700, or 2000 micrometers.

Owing to its porous nature, it is possible for the acoustic absorbing filler to have a high surface area, and consequently, adsorption capacity. Having a high surface area can reflect a high degree of complexity and tortuosity of the pore structure, leading to greater internal reflections and energy transfer to the solid structure through frictional losses. This is manifested as absorption of airborne noise. The specific surface area of the acoustic absorbing filler can be from 0.1 $m^2/g$ to 1000 $m^2/g$, from 0.5 $m^2/g$ to 1000 $m^2/g$, from 1 $m^2/g$ to 1000 $m^2/g$, from 50 $m^2/g$ to 900 $m^2/g$, or in some embodiments, less than, equal to, or greater than 0.1 $m^2/g$, 0.2, 0.5, 0.7, 1, 2, 5, 10, 20, 50, 100, 120, 150, 200, 250, 300, 350, 400, 450, 500, 900, or 1000 $m^2/g$.

Surface area can be measured based on the sorption of various pure gases (such as diatomic nitrogen gas or carbon dioxide) onto the surface of a given material. These measurements can be performed using an instrument known a gas sorption analyzer. In this measurement, one can generate an isotherm (volume of gas adsorbed at standard temperature and pressure per unit mass versus relative pressure) by dosing a sample with gas. By applying a modified form of the Langmuir equation known as the Brunauer-Emmett-Teller (BET) equation to the isotherm, it is possible to calculate the surface area. This value is known as the BET (specific) surface area, or the multi-point BET surface area (MBET surface area) if multiple points of the isotherm are used in the equation. In some embodiments, the surface area, as referred to herein, is the BET surface area.

Additionally, when the energetics of sorption are known, and general model of the pore structure exists, one can model the adsorption of a fluid on a solid phase for given equilibrium state (i.e. a global minimum) for the grand potential of the overall thermodynamic system. Density functional theory (DFT) is frequently employed to perform this analysis, which provides more accurate results than the simplified BET equation. Quenched state DFT (QSDFT) models are preferably employed when available, as they are two-component, accounting for the energetics of solid-solid interactions. These DFT models allow for analysis of the amount of surface area provided for a given range (or bin) of pore diameters. In some embodiments, the surface area, as referred to herein, is the QSDFT surface area for a specific range of pore diameters. From these analyses, one can also determine if a material contains primarily micropores, mesopores, macropores (pores with a diameter greater than 50 nm), or hierarchical porosity (smaller pores nested within larger pores).

The acoustic absorbing filler can have a total pore volume of from 0.05 $cm^3/g$ to 2 $cm^3/g$. In some embodiments, the total pore volume can be less than, equal to, or greater than, 0.05 $cm^3/g$, 0.07, 0.1, 0.2, 0.3, 0.4, 0.5, 0.7, 1, 1.2, 1.4, 1.6, 1.8, or 2 $cm^3/g$. This value can be determined using DFT analysis, or via analysis of the volume of gas adsorbed at a pressure (P) close to the saturation point ($P_o$), typically at a relative pressure ($P/P_o$) of 0.995. Similar to what is mentioned above, DFT can also be used to analyze the amount of specific pore volume provided for a given range (or bin) of pore sizes.

The porous particulates can be present in an amount of less than 70%, 60%, 50%, 40%, 35%, 30%, 20%, or 15% by weight relative to the overall weight of acoustic absorbing filler. The binder can be present in an amount of more than 10%, 20%, 30%, 40%, 50%, 60%, 65%, 70%, 80%, or 85% by weight relative to the overall weight of acoustic absorbing filler.

When tested as a packed bed with 20 mm thickness, the acoustic absorbing filler has a normal incidence acoustic absorption of 0.60, 0.50, 0.40, 0.30 or 0.20 alpha at 400 Hz or more than 0.20, 0.30, 0.40, or 0.50 alpha at 400 Hz, in some embodiments, for systems not exhibiting one or more resonance peak at low frequencies.

The acoustic absorbing filler of the present disclosure can have equivalent or improved acoustic performance in a packed bed configuration or when integrated into an acoustic article though it has a lower specific surface area and pore volume than the filler comprising only porous particulates, for example, pure, unmilled activated carbon. The acoustic absorbing filler of the present disclosure has a lower specific surface area because it has both porous particulates and binder, yet can match the performance of particles with much higher surface area, contrary to what is known in the art.

Porous Layers

The provided acoustic articles include one or more porous layers. Useful porous layers include, but are not limited to, non-woven fibrous layers, perforated films, particulate beds, open-celled foams, nets, woven fabrics, structured films, and combinations thereof.

Engineered non-woven fibrous layers containing fine fibers can be effective sound absorbers in aerospace, automotive, shipping, and building applications. Non-woven materials having a plurality of fine fibers can be especially effective at high sound frequencies, a regime in which the surface area of the structure promotes viscous dissipation of sound energy. Non-woven layers may be made from inorganic materials such as fiberglass, basalt, silicate compounds, alumina, and aluminosilicates. Polymeric non-woven layers can be made, for example, by melt blowing or melt spinning.

In melt-blowing, one or more thermoplastic polymer streams are extruded through a die containing closely arranged orifices and attenuated by convergent streams of hot air at high velocities to form fine fibers. These fine fibers can be collected on a surface to provide a melt-blown non-woven fibrous layer. Depending on the operating parameters chosen, e.g., degree of solidification from the molten state, the collected fibers may be semi-continuous or essentially discontinuous. In certain exemplary embodiments, the melt-blown fibers of the present disclosure may be oriented on a molecular level. The fibers can be interrupted by defects in the melt, crossing of formed filaments, excessive shear due to turbulent air used in attenuating the fibers or other events occurring in the formation process. They are generally understood to be semi-continuous or having the length much longer than the distance between fiber entanglements so that individual fibers cannot be removed from the fiber mass intact end-to-end.

In melt spinning, the non-woven fibers are extruded as filaments out of a set of orifices and allowed to cool and solidify to form fibers. The filaments are passed through an air space, which may contain streams of moving air, to assist in cooling the filaments and passing through an attenuation (i.e., drawing) unit to at least partially draw the filaments. Fibers made through a melt spinning process can be "spunbonded," whereby a web comprising a set of melt spun fibers are collected as a fibrous web and optionally subjected to one or more bonding operations to fuse the fibers to each other. Melt-spun fibers are generally larger in diameter than melt-blown fibers.

The fibers can be made from a polymer selected from polyolefin, polypropylene, polyethylene, polyester, polyethylene terephthalate, polybutylene terephthalate, polyamide, polyurethane, polybutene, polylactic acid, polyphenylene sulfide, polysulfone, liquid crystalline polymer, polyethylene-co-vinylacetate, polyacrylonitrile, cyclic polyolefin, or copolymer or blend thereof in an amount of at least 35% by weight, based on the overall weight of the plurality of fibers. Suitable fibers materials also include elastomeric polymers.

Non-woven layers based on aliphatic polyester fibers can be especially advantageous in resisting degradation or shrinkage at high temperature applications. Molecular weights for useful aliphatic polyesters can be in the range of from 15,000 g/mol to 6,000,000 g/mol, from 20,000 g/mol to 2,000,000 g/mol, from 40,000 g/mol to 1,000,000 g/mol, or in some embodiments, less than, equal to, or greater than 15,000 g/mol; 20,000; 25,000; 30,000; 35,000; 40,000; 45,000; 50,000; 60,000; 70,000; 80,000; 90,000; 100,000; 200,000; 500,000; 700,000; 1,000,000; 2,000,000; 3,000,000; 4,000,000; 5,000,000; or 6,000,000 g/mol.

The melt-blown or melt-spun fibers of the non-woven fibrous layer can have any suitable diameter. The fibers can have a median diameter of from 0.1 micrometers to 10 micrometers, from 0.3 micrometers to 6 micrometers, from 0.3 micrometers to 3 micrometers, or in some embodiments, less than, equal to, or greater than 0.1 micrometers, 0.2, 0.3, 0.4, 0.5, 0.6, 0.7, 0.8, 0.9, 1, 1.5, 2, 2.5, 3, 3.5, 4, 4.5, 5, 5.5, 6, 6.5, 7, 7.5, 8, 8.5, 9, 9.5, 10, 11, 12, 13, 14, 15, 16, 17, 18, 19, 20, 22, 25, 27, 30, 32, 35, 37, 40, 42, 45, 47, or 50 micrometers.

Optionally, at least some of the plurality of fibers in the non-woven fibrous layer are physically bonded to each other or to the acoustic absorbing filler. Conventional bonding techniques using heat and pressure applied in a point-bonding process or by smooth calendar rolls can be used, though such processes may cause undesired deformation of fibers or compaction of the web. Optionally, attachment between fibers or between fiber and the acoustic absorbing filler may be achieved by incorporating a binder into the non-woven fibrous layer. In some embodiments, the binder is provided by a liquid or a solid powder. In some embodiments, the binder is provided by staple binder fibers, which may be injected into the polymer stream during a melt blowing process. Binder fibers have a melting temperature significantly less than that of remaining structural fibers, and act to secure the fibers to each other. Other techniques for bonding the fibers is taught in, for example, U.S. Patent Publication No. 2008/0038976 (Berrigan et al.) and U.S. Pat. No. 7,279,440 (Berrigan et al.). One technique involves subjecting the collected web of fibers to a controlled heating and quenching operation that includes forcefully passing through the web a gaseous stream heated to a temperature sufficient to soften the fibers sufficiently to cause the fibers to bond together at points of fiber intersection, where the heated stream is applied for a time period too short to wholly melt the fibers, and then immediately forcefully passing through the web a gaseous stream at a temperature at least 50° C. less than the heated stream to quench the fibers.

In some embodiments, two different kinds of molecular phases are present within the fibers. For example, a predominantly semi-crystalline phase may co-exist with a predominantly amorphous phase. As another example, a predominantly semi-crystalline phase may co-exist with a phase containing domains of lower crystalline order (e.g., one in which the polymers are not chain-extended) and domains that are amorphous, the overall degree of order being insufficient for crystallinity. Such fibers can also be processed under heat as above to form a non-woven fibrous layer.

In some embodiments, the fibers of the non-woven fibrous layer do not substantially melt or lose their fiber structure during the bonding operation, but remain as discrete fibers with their original fiber dimensions.

In some embodiments, the fiber polymers display high glass transition temperatures, which can be desirable for use in high temperature applications. Certain non-woven fibrous layers shrink significantly when heated to even moderate temperatures in subsequent processing or use, such as use as a thermal insulation material. Such shrinkage has been shown to be problematic when the melt-blown fibers include thermoplastic polyesters or copolymers thereof, and particularly those that are semi-crystalline in nature.

In some embodiments, the provided non-woven fibrous layers have at least one densified layer adjacent to a layer that is not densified. Either or both of the densified and non-densified layers may be loaded with acoustic absorbing filler. It can be cost effective for the densified layer and adjacent non-densified layer to be prepared from a unitary layer of non-woven fibrous layer having a uniform density.

The provided methods can, if desirable, provide a densified layer that has a uniform distribution of polymeric fibers throughout the layer. Alternatively, the distribution of polymeric fibers can be intentionally made non-uniform across a major surface of the non-woven fibrous layer, whereby the acoustic response can be tailored based on its location along the major surface.

In some embodiments, the median fiber diameters of the densified and non-densified portions of the non-woven fibrous layer are substantially the same. This can be realized, for example, by way of a process capable of fusing the fibers to each other in the densified region without significant melting of the fibers. Avoidance of melting the fibers can preserve the acoustic benefit that derives from the high surface area produced within the densified layer of the non-woven fibrous layer.

Engineered non-woven fibrous layers can display numerous advantages, some of which are unexpected. These materials can be used in thermal and acoustic insulation applications at high temperatures where conventional insulation materials would thermally degrade or fail. Particularly demanding are automotive and aerospace vehicle applications, where insulation materials operate in environments that are not only noisy but can reach extreme temperatures.

The provided non-woven layers can resist shrinkage at temperatures as high as 150° C. or greater, as might be encountered in automotive and aerospace applications. Shrinkage can result from crystallization during heat exposure or processing, and is generally undesirable because it can degrade acoustic performance and impact the structural integrity of the product. The provided non-woven fibrous layers can exhibit a Shrinkage after being heated to 150° C. for 7 days, as measured using the Shrinkage test method described in U.S. Patent Publication No. 2016/0298266 (Zillig et al.), of less than 15%, 14%, 13%, 12%, 11%, 10%, 9%, 8%, 7%, 6%, 5%, 4%, 3%, 2% or 1%. Such Shrinkage values can apply along both the machine and cross-web directions. In some embodiments, disposing acoustic absorbing filler into the interstices of non-woven layer can further reduce the degree of shrinkage at high temperatures.

As a further advantage, the densified layer can enable the non-woven fibrous layers to be thermally molded into three-dimensional structures that are dimensionally stable. Articles and assemblies based on such structures can be shaped to fit substrates having customized three-dimensional shapes. Customizing the shape of the article or assembly for a particular application optimizes use of space and simplifies attachment to, for example, an automotive or aerospace component. Because these shaped structures are dimensionally stable, these articles and assemblies also reduce the risk of de-lamination compared with conventional acoustic and thermal insulation products, which have the tendency to spring back to their original, planar configuration.

Yet another advantage relates to the ability to make non-woven fibrous layers that not only operate at high temperatures and are dimensionally stable, but also maintain their overall surface area within both densified and non-densified portions of the web. Retention of the surface area provided by the surface of the fibers (especially those with narrow diameters), in combination with acoustic absorbing filler, allows the material to not suffer from a degradation in performance due to heat-induced instability in the structure of the article. External surface area, i.e. not contained within internal porosity, is relevant because the ability of the non-woven fibrous layer to dissipate noise is based on viscous dissipation at the fiber surfaces, where kinetic energy of sound pressure waves is converted into heat.

When manufacturing non-woven fibrous webs from a single layer, fewer processing and web handling steps are necessary compared with processes used to manufacture articles containing multiple layers. Reducing the number of layers in the end product, while preserving its performance properties, simplifies manufacturing and reduces associated costs.

Other non-woven fibrous layers that may be used in the acoustic article include recycled textile fibers, sometimes referred to as shoddy. Recycled textile fibers, staple fibers, inorganic fibers and natural fibers can be formed into a non-woven structure using an air laid process, in which a wall of air blows fibers onto a perforated collection drum having negative pressure inside the drum. The air is pulled though the drum and the fibers are collected on the outside of the drum where they are removed as a web. Because of the air turbulence, the fibers are not in any ordered orientation and thus can display strength properties that are relatively uniform in all directions.

Other non-woven fibrous layers that may be used in the acoustic article include those made using a wet laid process. A wet laying or "wetlaid" process comprises (a) forming a dispersion comprising one or more types of fibers, optionally a polymeric binder, and optionally a particle filler(s) in at least one dispersing liquid (preferably water); and (b) removing the dispersing liquid from the dispersion.

In some embodiments, one or more additional fiber populations are incorporated into the non-woven fibrous layer. Differences between fiber populations can be based on, for example, composition, median fiber diameter, median fiber length, and/or fiber shape.

In some embodiments, a non-woven fibrous layer can include a plurality of first fibers having a median diameter of less than 10 micrometers and a plurality of second fibers having a median diameter of at least 10 micrometers. For various reasons, it can be advantageous to have fibers of different diameters. Inclusion of the thicker second fibers can improve the resiliency of the non-woven fibrous layer, crush resistance, and help preserve the overall loft of the web. The second fibers can be made from any of the polymeric materials previously described with respect to the first fibers and may be made from a melt blown or melt spun process.

The fibers of the non-woven layer can have any suitable fiber diameter to provide desirable mechanical, acoustic, and/or thermal properties. For example, either or both of the first and second fibers can have a median fiber diameter of at least 10 micrometers, from 10 micrometers to 60 micrometers, from 20 micrometers to 40 micrometers, or in some embodiments, less than, equal to, or greater than 10 micrometers, 11, 12, 13, 14, 15, 16, 17, 18, 19, 20, 22, 25, 27, 30, 32, 35, 37, 40, 45, 50, 55, or 60 micrometers.

In some embodiments, the second fibers are staple fibers that are interspersed with the first plurality of the fibers. The staple fibers can include binder fibers and/or structural fibers. Binder fibers include, but are not limited to, any of the above-mentioned polymeric fibers. Suitable structural fibers can include, but are not limited to, any of the above-mentioned polymeric fibers, as well as inorganic fibers such as ceramic fibers, glass fibers, and metal fibers; and biologically-derived fibers such as cellulosic fibers. The blending of staple fibers into the non-woven layer is sometimes referred to as carding.

Additional options and advantages associated with combinations of the first and second fibers are described, for example, in U.S. Pat. No. 8,906,815 (Moore et al.).

Porous layers need not be fibrous in nature. For instance, the one or more porous layers use a perforated film. Perforated films are comprised of a film or wall having a multiplicity of perforations, or through-holes, extending therethrough. The perforations allow for the propogation of pressure waves from one side of the film or wall to the opposing side.

Enclosed within the perforations are plugs of air that act as mass components within a resonant system. These mass components vibrate within the perforations and dissipate sound energy from friction between the plugs of air and the walls of the perforations. If the perforated film is disposed next to an air cavity, dissipation of sound energy may also occur through destructive interference at the entrance of the perforations from any sound waves reflected back towards the perforations from the opposite direction. Absorption of sound energy can take place with essentially zero net flow of fluid through the acoustic article.

The perforations can be provided with dimensions (e.g. perforation diameter, shape and length) suitable to obtain a desired acoustic performance over a given frequency range. Acoustic performance can be measured, for example, by reflecting sound off of the perforated film and characterizing the decrease in acoustic intensity as a result of near-field dampening as compared to the result from a control sample.

The perforations are disposed along the entire surface of the perforated film. Alternatively, the wall could be only partially perforated—that is, perforated in some areas but not others. In certain instances, perforated areas of the wall can extend along longitudinal directions and be adjacent to one or more non-perforated areas—for example, the wall could have a rectangular cross-section tube with only one or two sides perforated.

The perforations can have a wide range of shapes and sizes and may be produced by any of a variety of molding, cutting or punching operations. The cross-section of the perforations can be, for example, circular, square, or hexagonal. In some embodiments, the perforations are represented by an array of elongated slits. While the perforations may have diameters that are uniform along their length, it is possible to use perforations that have the shape of a conical frustum or otherwise have side walls tapered along at least some their length. Tapering the side walls of the perforations can be advantageous, as described later, in enabling acoustic absorbing filler to be received within the perforations. Various perforation configurations and ways of making the same are described in U.S. Pat. No. 6,617,002 (Wood).

Optionally, the perforations have a generally uniform spacing with respect to each other. If so, the perforations may be arranged in a two-dimensional grid pattern or staggered pattern. The perforations could also be disposed on the wall in a randomized configuration where the exact spacing between neighboring perforations is non-uniform but the perforations are nonetheless evenly distributed across the wall on a macroscopic scale.

In some embodiments, the perforations are of essentially uniform diameter along the wall. Alternatively, the perforations could have some distribution of diameters. In either case, the average narrowest diameter of the perforations can be less than, equal to, or greater than 10 micrometers, 15, 20, 25, 30, 35, 40, 45, 50, 60, 70, 80, 90, 100, 110, 120, 150, 170, 200, 250, 300, 350, 400, 450, 500, 600, 700, 800, 900, 1000, 1500, 2000, 2500, 3000, 4000, or 5000 micrometers. For clarity, the diameter of non-circular holes is defined herein as the diameter of a circle having the equivalent area as the non-circular hole in plan view.

Compared to other porous layers, perforated films can be made relatively thin while retaining their acoustic absorption properties. Perforated films can have an overall thickness of from 1 micrometer to 2 millimeters, from 30 micrometers to 1.5 millimeters, from 50 micrometers to 1 millimeter, or in some embodiments, less than, equal to, or greater than, 1 micrometer, 2, 5, 10, 20, 30, 40, 50, 100, 200, 500, 700 micrometers, 1 millimeter, 1.1, 1.2, 1.5, 1.7, or 2 millimeters. In some embodiments, a perforated slab is used instead of a perforated film, where the perforated slab has a thickness of up to 3 millimeters, 5, 10, 30, 50, 100, or even 200 millimeters. The porosity of the perforated film is a dimensionless quantity representing the fraction of a given volume not occupied by the film. In a simplified representation, the perforations can be assumed to be cylindrical, in which case porosity is well approximated by the percentage of the surface area of the wall displaced by the perforations in plan view. In exemplary embodiments, the wall can have a porosity of 0.1% to 10%, 0.5% to 10%, or 0.5% to 5%. In some embodiments, the wall has a porosity less than, equal to, or greater than 0.1%, 0.2, 0.3, 0.4, 0.5, 0.7, 1, 2, 3, 4, 5, 6, 7, 8, 9, or 10%.

The film material can have a modulus (e.g., flexural modulus) suitably tuned to vibrate in response to incident sound waves having relevant frequencies. Along with the vibrations of the air plugs within the perforations, local vibrations of the wall itself can dissipate sound energy and enhance transmission loss through the acoustic article. The flexural modulus, reflecting the stiffness, of the wall also directly affects its acoustic transfer impedance.

In some embodiments, the film comprises a material having a flexural modulus of from 0.2 GPa to 10 GPa, 0.2 GPa to 7 GPa, 0.2 GPa to 4 GPa, or in some embodiments, less than, equal to, or greater than a flexural modulus of 0.2 GPa, 0.3, 0.4, 0.5, 0.7, 1, 2, 3, 4, 5, 6, 7, 8, 9, 10, 12, 15, 17, 20, 25, 30, 35, 40, 50, 60, 70, 80, 90, 100, 120, 140, 160, 180, 200, or 210 GPa.

Suitable thermoplastic polymers typically have a flexural modulus in the range of from 0.2 GPa to 5 GPa. Addition of fibers or other fillers can, in some embodiments, increase the flexural modulus of these materials to 20 GPa. Thermoset polymers generally have a flexural modulus in the range of from 5 GPa to 40 GPa. Useful polymers include polyolefins, polyesters, fluoropolymers, polylactic acid, polyphenylene sulfide, polyacrylates, polyvinylchloride, polycarbonates, polyurethanes, and blends thereof.

Acoustic performance characteristics that can be ascribed to a plurality of perforations disposed in a flexible film are described in, for example, U.S. Pat. No. 6,617,002 (Wood), U.S. Pat. No. 6,977,109 (Wood), and U.S. Pat. No. 7,731,878 (Wood). Acoustic filler particles can be loaded into the perforations of the film to enhance the overall properties of the film, including acoustic absorption properties, In some embodiments, the porous layer includes a particulate bed. The particle bed may contain non-porous materials, such as milled polymer granules, glass beads, or ceramic materials, or porous materials, such as clays, perlite, or granules of biomass. None, some, or all of the particles of the particulate bed may be acoustic absorbing filler that is acoustically active. The porosity of the particulate bed can be adjusted in part based on the size distribution of the particles. The particles may be in a range of from 100 micrometers to 2000 micrometers, from 5 micrometers to 1000 micrometers, from 10 micrometers to 500 micrometers, or in some embodiments, less than, equal to, or greater than, 0.1 micrometers, 0.5, 1, 2, 5, 10, 20, 30, 40, 50, 70, 100, 200, 300, 400, 500, 700, 1000, 1500, or 2000 micrometers.

A porous layer can be generally characterized by its specific acoustic impedance, which is the ratio in frequency space of pressure differences across the layer and the effective velocity approaching the layer surface. In the theoretical model based on a rigid film with perforations, for example, the velocity derives from air moving into and out of the holes. If the film is flexible, motion of the wall can contribute to the acoustic impedance calculation. Specific acoustic impedance generally varies as a function of frequency and is a complex number, which reflects the fact that pressure and velocity waves can be out of phase with each other.

As used herein, specific acoustic impedance is measured in MKS Rayls, in which 1 MKS Rayl is equal to 1 pascal-second per meter ($Pa \cdot s \cdot m^{-1}$), or equivalently, 1 newton-second per cubic meter ($N \cdot s \cdot m^{-3}$), or alternatively, 1 $kg \cdot s^{-1} \cdot m^{-2}$.

A porous layer can also be characterized by its transfer impedance. For a perforated film, transfer impedance is the difference between the acoustic impedance on the incident side of the porous layer and the acoustic impedance one would observe if the perforated film were not present—that is, the acoustic impedance of the air cavity alone.

The flow resistance is the low frequency limit of the transfer impedance. Experimentally, this can be estimated by blowing a known, small velocity of air at the porous layer and measuring the pressure drop associated therewith. The flow resistance can be determined as the measured pressure drop divided by the velocity.

For embodiments that include a perforated film, the flow resistance through the perforated film alone (absent the acoustic absorbing filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the perforated film can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

For embodiments that include a non-woven fibrous layer, the flow resistance through the non-woven fibrous layer alone (absent the acoustic absorbing filler) can be from 50 MKS Rayls to 8000 MKS Rayls, 100 MKS Rayls to 4000 MKS Rayls, or 400 MKS Rayls to 3000 MKS Rayls. In some embodiments, the flow resistance through the non-woven fibrous layer can be less than, equal to, or greater than 50 MKS Rayls, 60, 70, 80, 90, 100, 120, 140, 160, 180, 200, 250, 300, 350, 400, 450, 500, 550, 600, 650, 700, 750, 800, 850, 900, 950, 1000, 1100, 1200, 1300, 1400, 1500, 1600, 1700, 1800, 1900, 2000, 2500, 3000, 3500, 4000, 4500, 5000, 5500, 6000, 6500, 7000, 7500, or 8000 MKS Rayls.

The flow resistance through the overall acoustic article can be from 1000 MKS Rayls to 10,000 MKS Rayls, or 2500 MKS Rayls to 7000 MKS Rayls. In some embodiments, the flow resistance through the overall acoustic article is less than, equal to, or greater than 1000 MKS Rayls 1000, 1100, 1200, 1500, 1700, 2000, 2500, 3000, 3500, 4000, 4500, 5000, 5500, 6000, 6500, 7000, 7500, 8000, 9000 or 10,000 MKS Rayls.

Acoustic Articles

Acoustic articles according to one exemplary embodiment are illustrated in FIG. 1 and hereinafter referred to by respective numeral 100. In FIG. 1, the direction of incident and reflected sound waves are represented by barred arrows, where applicable.

The article 100 is comprised of three primary layers. The layers include, in the following order, a first porous layer 102, a second porous layer 104, and a third porous layer 106. Optionally and as shown, the porous layers 102, 104 and porous layers 104, 106 directly contact each other. In some embodiments, one or more additional layers can be disposed between these layers or extend along the exterior facing major surfaces of porous layers 102, 106. Alternatively, one or both of porous layers 102, 106 could be omitted.

In the article 100, the porous layers 102, 104, 106 are depicted as fibrous non-woven layers, but it is to be understood that other kinds of porous layers (e.g., open-celled foams, particulate beds, perforated films) may be used instead, as described in detail in the sub-section above entitled "Porous layers." As indicated in FIG. 1, the second porous layer 104 contains acoustic absorbing filler, while the porous layers 102, 106 are substantially devoid of acoustic absorbing filler.

Acoustic absorbing filler having desirable acoustic properties, such as porous particulate, is enmeshed in the plurality of fibers in the second porous layer 104. The acoustic absorbing filler 108 can be present in an amount of from 1% to 99%, 10% to 90%, 15% to 85%, 20% to 80%, or in some embodiments, less than, equal to, or greater than 1%, 2, 3, 4, 5, 7, 10, 12, 15, 20, 25, 30, 35, 40, 45, 50, 55, 60, 65, 70, 75, 80, 85, 90, 95, 97, 98, or 99% by weight relative to the overall weight of the second porous layer 104 and acoustic absorbing filler contacting the second porous layer 104.

Optionally, but not shown, the acoustic absorbing filler may be only partially enmeshed in the second porous layer 104, with some acoustic absorbing filler residing outside of the second porous layer 104.

Advantageously, the addition of acoustic absorbing filler comprised of porous particulate can substantially increase acoustical absorption of the acoustic article at low sound frequencies, such as sound frequencies of from 50 Hz to 1000 Hz. Additionally, the addition of acoustic absorbing filler comprised of porous particulate can increase acoustical absorption of the acoustic article at intermediate to high frequencies (1000 Hz to 10,000 Hz) such that alpha exceeds 0.7 in a random incident acoustic measurement (e.g., alpha cabin test) at frequencies from 2000 to 10000 Hz. In some embodiments, the addition of acoustic absorbing filler comprised of activated carbon can substantially increase acoustical absorption of the acoustic article over sound frequencies of less than, equal to, or greater than 50 Hz, 55, 60, 65, 70, 75, 80, 85, 90, 95, 100, 105, 110, 115, 120, 125, 130, 135, 140, 145, 150, 155, 160, 165, 170, 175, 180, 185, 190, 195, 200, 210, 220, 230, 240, 250, 260, 270, 280, 290, 300, 400, 500, 700, 1000, 2000, 3000, 4000, 5000, 7000, or 10,000 Hz.

In the depicted embodiment, the third porous layer 106 has a thickness significantly greater than that of the first porous layer 102.

In these constructions, one porous layer may have a thickness that is less than, equal to, or greater than 10%, 20%, 30%, 40%, 50%, 60%, 70%, 80%, 90%, 100%, 110%, 120%, 130%, 140%, 150%, 200%, 250%, 300%, 400%, 500%, 600%, 700%, 800%, 900%, or 1000% of the thickness of the other porous layer.

The provided acoustic articles preferably have an overall thickness that achieves the desired acoustic performance within the space constraints of the application at hand. An individual porous layer can have an overall thickness of from 1 micrometers to 10 centimeters, from 30 micrometers to 1 centimeter, from 50 micrometers to 5000 millimeters, or in some embodiments, less than, equal to, or greater than, 1 micrometers, 2, 5, 10, 20, 30, 40, 50, 100, 200, 500 micrometers, 1 millimeter, 2, 3, 4, 5, 7, 10, 20, 50, 70, or 100 millimeters.

The porous layer 106 can serve as resistive materials that improve the low frequency performance of the total acoustic structure. The porous layer 106 can also reduce acoustic particle velocity (referring to the air molecules), which tends to induce reflection of the sound wave upon reaching the particle-filled porous layer 104. Reflection tends to occur in this scenario because the acoustic impedance (pressure/velocity) becomes very high as velocity approaches zero. The presence of acoustic particles, however, can act as a pressure-reducing layer induced by reversible adsorption/desorption of air molecules as described previously, or by other mechanisms such as diffusive transport of air molecules into the pore network. Reducing pressure also lowers acoustic impedance, enabling some sound to penetrate and helping entrap more sound energy within the acoustic article 100, thereby improving acoustic performance.

In this embodiment, the acoustic absorbing filler is substantially decoupled from each other and any porous layers; that is, the particles of the acoustic absorbing filler are not physically attached to each other and capable of at least limited movement or oscillation independently from the surrounding structure. In these instances, the enmeshed particles can move and vibrate within the fibers of the non-woven material largely independently of the fibers themselves.

Alternatively, at least some of the acoustic absorbing filler could be physically bonded to the porous layers in which it is disposed. In some embodiments, these physical bonds are created by incorporating binders (e.g., binder fibers) within the porous layer, which can become tacky and adhere to the filler particles upon application of heat. To preserve the acoustic properties of the acoustic absorbing filler, it is generally preferable that the binder does not significantly flow into the pores of the filler particles. In some embodiments, it is possible to use the binder phase within the filler particles as means for physical bonding to the porous layer.

Substrates include structural components, such as components of an automobile or airplane and architectural substrates. Structural examples include molded panels (e.g., door panels), aircraft frames, in-wall insulation, and integral ductwork. Substrates can also include components next to these structural examples, such as carpets, trunk liners, fender liners, front of dash, floor systems, wall panels, and duct insulation. In some cases, a substrate can be spaced apart from the acoustic article, as might be the case with hood liners, headliners, aircraft panels, drapes, and ceiling tiles. Further applications for these materials include filtration media, surgical drapes, and wipes, liquid and gas filters, garments, blankets, furniture, transportation (e.g., for aircraft, rotorcraft, trains, and automotive vehicles), wheeled or tracked vehicles for agricultural applications (e.g. tractors, combines), wheeled or tracked vehicles for industrial applications (e.g. excavators, bulldozers, mobile drilling equipment), electronic equipment (e.g. for televisions, computers, servers, data storage devices, and power supplies), air handling systems, upholstery, and personal protection equipment.

Methods of Manufacture

The provided acoustic articles can be assembled using any of a number of suitable manufacturing methods.

Acoustic absorbing filler can be formed by spray drying to form agglomerates of the porous particulates and the binder. In some embodiments, the binder solution can be sprayed onto the spray-dried porous particulates in a vessel undergoing low shear or high shear agitation, or in a fluidized bed of the spray dried porous particulates. Larger agglomerates form during the course of these processes and partially dry during the processing, and the resultant fillers can have sufficient green body strength for handling. In other embodiments, no additional agglomeration steps are needed after the production of the initial spray-dried particles. Further treatments, such as thermal treatments or exposure to radiation, can be done to further improve filler robustness.

In some embodiments, the porous particulates and binder can be agitated in a fluidized bed. While the mixture is agitated, additional binder, a solution/suspension containing the binder, or water can be sprayed onto the particles. Agglomerates form and dry during this process, which imparts a green strength to the filler that allows for handling.

In some embodiments, binder components and porous particulates can be combined by dry mixing or via mixing in a bed with a fluid present to prevent dust cloud formation. This mixture can then be agitated under low or high shear as a binder, a binder-containing solution/suspension, or water is sprayed into the mixture. Agglomerates form during the course of these processes and partially dry during the processing, and the resultant fillers can have sufficient green body strength for handling. Oversize filler can also be crushed and classified to produce smaller filler that is within a specified size range. Further treatments, such as thermal treatments or exposure to radiation, can be done to further improve filler robustness.

In some embodiments, binder and porous particulates can be combined by dry mixing or wet mixing followed by heating to dry off the liquid (if present). The heating activates the binder, allowing it to soften and fuse the mixture into a composite block upon cooling. This block can then be crushed to form smaller agglomerates.

For embodiments in which the porous layer is a non-woven fibrous web, acoustic absorbing filler can be incorporated into the constituent fibers either during or after the direct formation of the fibers. Where the non-woven fibrous web is made using a melt blowing process, for example, the acoustic absorbing filler may be conveyed and co-mingled with the streams of molten polymer as they are blown onto a rotating collector drum. The acoustic absorbing filler may be entrained within a flow of heated air that converges with the hot air used to attenuate the melt blown fibers. An exemplary process is described in U.S. Pat. No. 3,971,373 (Braun). In a similar fashion, particles of acoustic absorbing filler can be conveyed into an air laid process, such as the process use to manufacture porous layers made from recycled textile fibers (i.e., shoddy).

Acoustic absorbing filler can also be added after the non-woven fibrous layer has been made. For example, the porosity of the non-woven fibrous layer could enable the acoustic absorbing filler to infiltrate into its interstitial spaces by homogeneously dispersing the acoustic absorbing filler into a liquid medium such as water, followed by roll coating or slurry coating the particle-filled medium onto the non-woven porous layer. As an alternative to using a liquid medium, one can entrain the acoustic absorbing filler in a gaseous stream, such as an air stream, and then direct the stream toward the non-woven layer to fill it.

Alternatively, acoustic absorbing filler can also be enmeshed into the porous layer by agitation. In one embodiment of this method, a non-woven fibrous layer is placed over a flat surface and a cylindrical conduit placed over it to define a coating area. Particles of the acoustic absorbing filler can then be poured into the conduit and the assembly agitated until the particles are fully migrated into the non-woven structure through its open pores. A similar method may be used for porous layers comprised of open-celled foams.

Construction of multilayered acoustic articles and attachment to substrates can include one or more lamination steps. Lamination may be achieved using an adhesive bond. Preferably, any adhesive layers used do not interfere with sound penetration into the absorbing layer. Alternatively, or in combination, physical entanglement of fibers may be used to improve interlayer adhesion. Mechanical bonds, using fasteners for example, are also possible.

The acoustic articles can also be edge sealed to prevent particle egress. Such containment can be achieved by densifying the edges, filling edges with a resin, quilting the acoustic article, or fully encasing the acoustic article in a sleeve to prevent particle movement or egress. Edge sealing can be desirable to improve product lifetime, durability, and facilitate handling and mounting. Edge sealing can also be performed for aesthetic reasons.

In yet another embodiment, a non-woven fibrous layer can be sequentially sprayed with an adhesive and then with the filler particles. In some instances, the adhesive may be provided in the form of hot melt fibers.

The following working examples are intended to be illustrative of the present disclosure and not limiting.

EXAMPLES

Objects and advantages of this disclosure are further illustrated by the following non-limiting examples, but the particular materials and amounts thereof recited in these examples, as well as other conditions and details, should not be construed to unduly limit this disclosure. Unless otherwise noted, all parts, percentages, ratios, etc. in the Examples and the rest of the specification are by weight.

Table of Materials

| Designation | Description | Source |
|---|---|---|
| MF650Y | Polypropylene metallocene homopolymer resin obtained under the trade designation "METOCENE MF650Y" | LyondellBasell Industries, Houston, TX |
| RHOPLEX VSR-50 | Polyacrylate binder (acrylic emulsion) obtained under the trade designation "RHOPLEX VSR-50" | Dow Inc., Midland, MI |

-continued

Table of Materials

| Designation | Description | Source |
|---|---|---|
| KOWA | PJAC steam-activated coconut shell carbon granules, sieved by the manufacturer between 40 and 140 US mesh size, obtained under the trade designation "PJ40140-233TM" | Philippine-Japan Active Carbon Corporation., Davao City, Philippines |
| L3S | Steam-activated marine wood carbon powder having a D50 of about 30 microns, obtained under the trade designation "ACTICARBONE L3S" | Calgon Carbon Corporation, Pittsburgh, PA |
| L4S | Steam-activated marine wood carbon powder having a D50 of about 30 microns, obtained under the trade designation "ACTICARBONE L4S". L4S is understood to be more highly activated than L3S. | Calgon Carbon Corporation, Pittsburgh, PA |
| RP-2 | Powdered, finely pulverized soft air float natural Kaolin clay, having a D50 of about 2 microns, obtained under the trade designation "ACTI-MIN RP-2" | Active Minerals International, LLC. Sparks, MD |
| OXBOW | Steam-activated wood-derived carbon granules obtained under the trade designation "NUCHAR AQUAGUARD LM 325" and sieved by the manufacturer between 80 and 325 US mesh size | Puragen Activated Carbons (formerly known as Oxbow), Palm Beach Gardens, FL. |
| NP-1 | Steam-activated coconut shell carbon powder, having a D50 of about 20 microns, obtained under the trade designation "AQUASORB NP-1" | Jacobi Carbons, Inc., Columbus, OH |
| N | Sodium silicate solution used as a binder, having a wt. ratio of $SiO_2$ to $Na_2O$ of 3.22, solids content of 37.6 wt. %, and viscosity of 180 cps. and obtained under the trade designation "N SODIUM SILICATE SOLUTION" | PQ Corporation, Malvern, PA |
| GW-H | Steam-activated coconut shell carbon powder obtained under the trade designation "KURARAY COAL GW-H", and sieved by the manufacturer between 32 and 60 US mesh size | Kuraray Co. Ltd., Tokyo, Japan |
| PE 2126 | Ultra-high molecular weight polyethylene powder obtained under the trade designation "GUR 2126". Its average particle size is reported as 35 microns. | Ticona Polymer, Inc. A business of Celanese, Florence, KY |
| PU | Polyurethane binder obtained under the trade designation "IROGRAN PS455-209". | Huntsman Polyurethanes, Auburn Hills, MI |
| STAR Sodium Silicate | Sodium silicate solution used as a binder, having a wt. ratio of $SiO_2$ to $Na_2O$ of 2.5, solids content of 37.1 wt. %, and viscosity of 60 cps, and obtained under the trade designation "STAR SODIUM SILICATE SOLUTION". | PQ Corporation, Malvern, PA |
| PP-1 | Film-grade polypropylene resin, obtained under the trade designation "C700-35N" | Braskem, São Paulo, Brazil |
| PP3019 | Carbon black-loaded polypropylene masterbatch obtained under the trade designation "PP 3019 BK MB" | RTP Company, Winona, MN |
| S-57495 | Red-pigmented anti-static polypropylene masterbatch obtained under the trade designation "199 X 141358 SS-57495 MB" | RTP Company, Winona, MN |
| TORAYCERAM | Yttria-stabilized zirconia spherical milling media obtained under the trade designation "TORAYCERAM BEADS" | Toray Industries, Inc. Tokyo, Japan |

Test Methods

Laser Scattering Particle Size Analysis

For certain materials, volume-weighted particle size distributions were determined using measurements taken on a laser scattering particle size analyzer (obtained under the trade designation "HORIBA LA-950" from Horiba, Ltd., Kyoto, Japan). A dispersion of the given material was made in either water or methyl ethyl ketone (MEK) at approximately 0.3 wt. % to 0.5 wt. % solids for the various materials. A dispersion was added to a measurement cell, which contained the corresponding solvent used for the dispersion. This addition was done until the transmittance was between the recommended minimum and maximum levels for the instrument. The standard algorithm in the supplied software was used to determine the distribution based on the scattering measurements. In these calculations, 1.33 and 1.3791 were used as the liquid refractive indices, for water and methyl ethyl ketone (MEK), respectively, and 1.8 was used as the solid refractive index. Dv10, Dv50, and Dv90 are reported and represent the $10^{th}$, $50^{th}$, and $90^{th}$ percentile of the volume weighted particle size distribution.

Sieved Particle Size Analysis

ASTM D2862-16 was followed to determine the size distribution via sieving of the particles. Step 7.2.1 was omitted. Bulk densities were determined as outlined below, in accordance with the procedure. A set of wire mesh screens (Retsch GmbH, Haan, Germany) with openings between 100 and 710 microns in approximately 100 micron increments were used. The aforementioned sieves, a lid, and a catch pan were placed into a sieve shaker (obtained under the trade name "AS 200" from Retsch GmbH). They were agitated at a setting of 1 mm (twice the pulse amplitude) for 10 minutes.

Scanning Electron Microscopy

The particles were sputter coated with either a thin palladium-gold alloy layer or a gold layer to make them conductive. The sputtered particles were placed on aluminum holders coated with double-sided sticky carbon tape and imaged using a scanning electron microscope (obtained under the trade designation "TM3000" from Hitachi High Technologies America, Inc, Schaumburg, IL) set to analytical mode for the probe current/accelerating voltage, or a "FEI PHENOM" (a model believed to be equivalent is presently available under the trade designation "PHENOM G1" from NanoScience Instruments, Phoenix, AZ) at a 5 kV accelerating voltage.

Bulk Density

Bulk densities were measured following ASTM D2854-09, except that the graduated cylinder was filled to 40 percent or greater of its capacity with the measured specimen.

Skeletal Density

Skeletal densities were measured by following ASTM D5550-14, with the following differences. The grinding step described in 10.2 was omitted since the particles were already similar in size to sand. For the pycnometry, a helium gas pycnometer (obtained under the trade designation "ACCUPYC II 1340 TEC" from Micromeritics, Norcross, GA) was used. Prior to obtaining measurements, the instrument was calibrated for measured volume using a metal ball of a specified, traceable volume. A 3.5 cc cup was used for the measurements, and measurements were taken at ambient temperature.

Gas Sorption

Materials were analyzed using a twin station gas sorption analyzer (obtained under the trade designation "AUTOSORB $IQ_2$-MP" from Anton Paar QuantaTec Inc., Boynton Beach, FL). A specimen was loaded into a 9 mm diameter sample tube and was outgassed to less than 100 mTorr (13.3 Pa) for at least 12 hours at 75° C. The KOWA and GW-H samples were outgassed at 200° C. for 12 hours. Helium was used for the void volume determination, which was performed periodically during the measurement. Isotherms were measured using nitrogen gas at 77 K, and quenched-state density functional theory (QSDFT) analysis was performed using a kernel with carbon as the adsorbent, nitrogen at 77 K as the adsorbate, and slit-like pore geometry. Application of the multi-point Brunauer-Emmett-Teller (MBET) equation was performed on the adsorption branch using points from 0.02 to 0.1 P/Po for carbon samples and 0.05 to 0.35 P/Po for other samples. Total pore volume was calculated using a point on the adsorption branch taken at approximately 0.995 P/Po.

Thermogravimetric Analysis

Thermogravimetric analysis (TGA) was performed using a thermal analysis instrument (obtained under the trade designation "DTG-60AH" from Shimadzu Corporation, Kyoto, Japan). Aluminum oxide crucibles were used for both the reference and sample pans. Analyses were carried out a rate of 5° C./min to 1000° C. under a flow of air (20 mL/min). The weight percent of the carbon phase in the feed was calculated using final weight loss adjusted for the weight lost from the binder, adsorbed water, and the kaolin phase. The loss in the kaolin is due to organic material burnout (minor) and the kaolin to metakaolin transition (major). A thermogram of the parent RP-2 kaolin material was used to make that adjustment, while water loss and binder burnout were separate, identifiable thermal events.

Nonwoven Thickness Test 1

The sample thickness of a 5.25 in (13.34 cm) diameter disc was measured using a thickness testing gauge having a tester foot with dimensions of 5 cm×12.5 cm at an applied pressure of 150 Pa.

Nonwoven Thickness Test 2

The sample thickness of strips with dimensions of 1.2 m×0.2 m was measured using a thickness tester (obtained under the trade designation "GUSTIN-BACON MEASURE-MATIC" from CertainTeed®, Malvern, PA) having an attached analog dial indicator. A 130.14 g weight is used to give an applied pressure of 2 Psi (14 kPa). For a given material, two strips are measured. For each of the strips, the thickness of the two ends (lengthwise) are measured and the values are averaged. The measurements from each of the two strips are then averaged to provide the reported value.

Air Flow Resistance (AFR) Test 1

A high-speed automated filter tester (obtained under the trade designation "8130" from TSI Inc., Shoreview, MN) was operated with particle generation and measurement turned off. Flowrate was adjusted to 85 liters per minute (LPM) and a 5.25 in (13.34 cm) diameter sample was used. The sample was placed onto the lower circular plenum opening and the tester was engaged. A pressure transducer (obtained from MKS Instruments, Inc., Andover, MA) within the device measured the pressure drop in mm $H_2O$.

Air Flow Resistance (AFR) Test 2

Air flow resistance was measured from a 47 mm disk using a 44.44 mm holder according to ASTM C-522-03 (Reapproved 2009), "Standard Test Method for Airflow Resistance of Acoustical Materials" using a "static airflow resistance meter" (obtained under the trade designation "SIGMA", and running "SIGMA-X" software, both from Mecanum, Inc., Sherbrooke, Canada).

Nonwoven Effective Fiber Diameter

The term "effective fiber diameter" or "EFD" is the apparent diameter of the fibers in a fiber web based on Air Flow Resistance Test 1. Based on the measured pressure drop, the Effective Fiber Diameter is calculated as set forth in C. N. Davies, The Separation of Airborne Dust and Particulates, Institution of Mechanical Engineers, London Proceedings, IB (1952).

Acoustic Measurements

A kit (obtained under the trade designation "IMPEDANCE TUBE KIT (50 HZ-6.4 KHZ) TYPE 4206" from Brüel & Kjær. Nærum, Denmark) was used. Normal incident acoustical absorption was tested according to ASTM E1050-12, "Standard Test Method for Impedance and Absorption of Acoustical Materials Using a Tube, Two Microphones and a Digital Frequency Analysis System" with the modifications specified below. The impedance tube was 63 mm in diameter and oriented vertically, with the microphones above the sample chamber. The normal incident absorption coefficient was reported with respect to one third octave band frequency using the abbreviation “a,” and a grammage (g/m$^2$ or GSM)-normalized absorption was also reported. For particles, the sample chamber in the tube was filled to a depth of 20 mm for all measurements unless specified, and the added material was weighed after the test to determine the GSM-normalized absorption. For particle-loaded nonwoven samples, discs were punched out using a 63-mm punch and the sample chamber was set to a depth equivalent to the thickness of the media. For loaded film samples, the samples were tested as 68-mm discs and placed directly over a 68-mm metal screen resting on the lip of the sample chamber set to a 20-mm gap height.

Examples containing particle-loaded nonwovens were also tested for sound absorption according to SAE J2883 “Laboratory Measurement of Random Incidence Sound Absorption Tests Using a Small Reverberation Room” under the conditions listed below. The instrument used was an acoustic absorption measurement device (obtained under the trade designation “ALPHA CABIN” from Autoneum, Winterthur, Switzerland). In the test, 1.20 m$^2$ of material was used in a suitable frame at 22° C. and 55% humidity. For this test, webs were tested with the side that had been facing the collector drum, when made, facing upward in the ALPHA CABIN. When indicated, certain samples were allowed to re-loft overnight after being unfurled, increasing their thickness. The thickness at which the measurement was taken was recorded through Thickness Test 2 at the time of the alpha cabin measurement.

Particle Preparation

Sieving of KOWA

The KOWA was classified in batches into two size cuts: 40×60 mesh (250-420 microns) and 60×80 mesh (177-250 microns) using three sieves with wire mesh screens (obtained under the trade designation “RETSCH” from Retsch GmbH, Haan, Germany), the first with 40 mesh (420 micron) openings the second with 60 mesh (250 micron) openings and the third with 80 mesh (177 micron) openings. These sieves were placed into a sieve shaker (obtained under the trade name “AS 200” from Retsch GmbH), and they were agitated at a setting of 1 mm for 10 minutes.

Milling of Input Materials

Input materials were placed in a plastic-lined jar filled with coarse alumina milling media (the media filled the jar roughly one-third full) and deionized (DI) water. The ratio of water to carbon was kept at 2:1 for the KOWA and 4:1 for the L3S. The jar was processed on a roller mill for 24 hours. Recovered slurries were then dried at 70-80° C. for 16 to 24 hours to obtain fine, milled powder. Any cakes in the powders were gently broken up by hand.

Examples 1-9 and Comparative Examples C1-C3

Synthesis of Acoustic Filler Agglomerates Containing a Latex through High Shear Agglomeration at Lab-Scale Particle agglomeration was conducted using the materials listed in Table 1. RHOPLEX VSR-50 was used as the binder for these materials. The ratio of the weights of the feed materials used for creating agglomerated particles are listed in Table 1 along with three Comparative Examples.

Materials were mixed in a food processor (obtained under the trade designation “KITCHENAID KFC3511GA” from Whirlpool Corporation, Benton Charter Township, MI). During addition of the binder and water suspension, the material was periodically broken up using a spatula to ensure uniform distribution of the binder. De-ionized (DI) water was added when needed to ensure that the majority of the agglomerates were between about 100 and 1000 micrometers. After mixing, the agglomerates were heated at 50° C. overnight for drying. Once dried, the agglomerates were classified using two sieves with wire mesh screens (Retsch GmbH, Haan, Germany), the first with 710 micron openings and the second with 100 micron openings. These sieves were placed into the AS 200 sieve shaker, and they were agitated at a setting of 1 mm for 10 minutes. Any agglomerated material that passed through the 710 micron screen and was blocked by the 100 micron screen was used for further acoustic testing.

Characterization of Acoustic Filler Agglomerates Made via High Shear Agglomeration Examples 1-9 and Comparative Examples C1-C3 underwent Gas Sorption Analysis, Bulk Density testing, Skeletal Density testing, and Thermogravimetric Analysis. Results are shown in Table 2. Surface areas and pore volumes for the micropore regime are reported via application of the QSDFT model for the nitrogen sorption isotherms; MBET and pore volume measurements were made as previously described. Table 3 shows the normal incidence acoustic absorption for the Examples and Comparative Examples in the 20 mm packed bed configuration. The absorption was normalized by the grammage (GSM) of the packed bed placed in the impedance tube, and results are shown in Table 4.

TABLE 1

| | | Wood-Based Carbons | | | | Coconut-Based Carbons | | Clay | Binder |
|---|---|---|---|---|---|---|---|---|---|
| Agglomerate | Example | L3S (g) | Milled L3S (g) | L4S (g) | OXBOW (g) | NP1 (g) | Milled KOWA (g) | RP-2 (g) | Rhoplex VSR-50 (g) |
| L3S:RP-2 20:80 | 1 | 15 | 0 | 0 | 0 | 0 | 0 | 60 | 5.03 |
| L3S:RP-2 50:50 | 2 | 37.5 | 0 | 0 | 0 | 0 | 0 | 37.5 | 5.03 |
| L3S:RP-2 70:30 | 3 | 52.5 | 0 | 0 | 0 | 0 | 0 | 22.5 | 5.03 |
| NP1:RP-2 20:80 | 4 | 0 | 0 | 0 | 0 | 15 | 0 | 60 | 5.03 |
| NP1:RP-2 50:50 | 5 | 0 | 0 | 0 | 0 | 37.5 | 0 | 37.5 | 5.03 |
| Milled L3S:RP-2 50:50 | 6 | 0 | 37.5 | 0 | 0 | 0 | 0 | 37.5 | 15.1 |
| Oxbow:RP-2 50:50 | 7 | 0 | 0 | 0 | 37.5 | 0 | 0 | 37.5 | 5.03 |
| Milled Kowa:RP-2 50:50 | 8 | 0 | 0 | 0 | 0 | 0 | 37.5 | 37.5 | 15.1 |
| L4S:Milled Kowa:RP-2 20:20:60 | 9 | 0 | 0 | 15 | 0 | 0 | 15 | 45 | 15.1 |
| RP-2 100 | C1 | 0 | 0 | 0 | 0 | 0 | 0 | 75 | 5.03 |
| KOWA 40 × 140 | C2 | NA | NA | NA | NA | NA | NA | NA | NA |
| GWH 48 × 100 | C3 | NA | NA | NA | NA | NA | NA | NA | NA |

TABLE 2

| | | Density Measurements | | Surface Area/Pore Volume Characterization | | | | TGA |
|---|---|---|---|---|---|---|---|---|
| Agglomerate | Example | Bulk Density (g/mL) | Skeletal Density (g/mL) | Surface Area (DFT/MBET, N2, 77K, $m^2/g$) | Micropore Volume (DFT $N_2$, 77K, mL/g) | Micropore Surface Area (DFT $N_2$, 77K, $m^2/g$) | Pore Volume ($N_2$, 77K, mL/g) | Activated Carbon Content (%) |
| L3S:RP-2 20:80 | 1 | 0.65 | 2.37 | 164 (MBET) | 0.05 | 171 | 0.29 | 32.7 |
| L3S:RP-2 50:50 | 2 | 0.44 | 2.27 | 407 (MBET) | 0.13 | 367 | 0.46 | 46.1 |
| L3S:RP-2 70:30 | 3 | 0.35 | 2.07 | 628 (MBET) | 0.21 | 575 | 0.58 | 65 |
| NP1:RP-2 20:80 | 4 | 0.80 | 2.40 | 178 (MBET) | 0.06 | 171 | 0.26 | 17.3 |
| NP1:RP-2 50:50 | 5 | 0.58 | 2.20 | 453 (MBET) | 0.18 | 520 | 0.31 | 46.4 |
| Milled L3S:RP-2 50:50 | 6 | 0.55 | 1.92 | 382 (MBET) | 0.13 | 386 | 0.4 | 46.9 |
| Oxbow:RP-2 50:50 | 7 | 0.33 | 2.19 | 642 (MBET) | 0.22 | 452 | 0.65 | NT** |
| Milled Kowa:RP-2 50:50 | 8 | 0.58 | 2.16 | 483 (MBET) | 0.18 | 479 | 0.33 | NT** |
| L4S:Milled Kowa:RP-2 20:20:60 | 9 | 0.42 | 2.18 | 737 (MBET) | 0.28 | 813 | 0.4 | NT** |
| RP-2 100 | C1 | 0.84 | 2.49 | 20 (MBET) | NT** | NT** | 0.19 | NT |
| KOWA 40 × 140 | C2 | 0.50 | NT** | 1111 (DFT)* | 0.42 | 1109 | 0.43 | 100 |
| GWH 48 × 100 | C3 | 0.42 | NT** | 1618 (DFT)* | 0.63 | 1589 | 0.75 | 100 |

*DFT used since material is solely activated carbon

**NT—Data Not Taken

TABLE 3

| Frequency | 124 Hz | 160 Hz | 200 Hz | 248 Hz | 316 Hz | 400 Hz | 500 Hz | 632 Hz | 800 Hz | 1000 Hz | 1248 Hz | 1600 Hz | 2000 Hz | 2500 Hz |
|---|---|---|---|---|---|---|---|---|---|---|---|---|---|---|
| Example 1 (α) | 0.07 | 0.09 | 0.12 | 0.16 | 0.22 | 0.27 | 0.32 | 0.42 | 0.42 | 0.46 | 0.50 | 0.54 | 0.56 | 0.58 |
| Example 2 (α) | 0.13 | 0.17 | 0.31 | 0.41 | 0.46 | 0.48 | 0.51 | 0.53 | 0.56 | 0.57 | 0.59 | 0.62 | 0.65 | 0.67 |
| Example 3 (α) | 0.14 | 0.19 | 0.35 | 0.43 | 0.48 | 0.50 | 0.53 | 0.54 | 0.57 | 0.58 | 0.60 | 0.62 | 0.64 | 0.66 |
| Example 4 (α)* | 0.06 | 0.08 | 0.10 | 0.11 | 0.13 | 0.16 | 0.19 | 0.24 | 0.31 | 0.37 | 0.43 | 0.51 | 0.57 | 0.63 |
| Example 5 (α) | 0.18 | 0.21 | 0.36 | 0.41 | 0.42 | 0.42 | 0.43 | 0.44 | 0.46 | 0.47 | 0.50 | 0.52 | 0.55 | 0.58 |
| Example 6 (α) | 0.08 | 0.08 | 0.16 | 0.29 | 0.36 | 0.37 | 0.38 | 0.37 | 0.40 | 0.39 | 0.41 | 0.42 | 0.44 | 0.47 |
| Example 7 (α) | 0.11 | 0.12 | 0.18 | 0.24 | 0.30 | 0.34 | 0.37 | 0.41 | 0.46 | 0.46 | 0.48 | 0.51 | 0.53 | 0.55 |
| Example 8 (α) | 0.16 | 0.17 | 0.23 | 0.29 | 0.35 | 0.39 | 0.42 | 0.45 | 0.50 | 0.53 | 0.56 | 0.59 | 0.61 | 0.65 |
| Example 9 (α) | 0.20 | 0.23 | 0.36 | 0.44 | 0.50 | 0.53 | 0.56 | 0.59 | 0.62 | 0.64 | 0.66 | 0.68 | 0.70 | 0.72 |
| Comp. Example C1 (α) | 0.06 | 0.06 | 0.09 | 0.14 | 0.21 | 0.26 | 0.31 | 0.35 | 0.38 | 0.40 | 0.42 | 0.44 | 0.47 | 0.47 |
| Comp. Example C2 (α) | 0.11 | 0.25 | 0.40 | 0.43 | 0.40 | 0.38 | 0.39 | 0.39 | 0.41 | 0.41 | 0.45 | 0.48 | 0.53 | 0.58 |
| Comp. Example C3 (α) | 0.21 | 0.28 | 0.42 | 0.51 | 0.51 | 0.47 | 0.48 | 0.48 | 0.56 | 0.52 | 0.55 | 0.58 | 0.60 | 0.62 |

*15 mm thick bed

TABLE 4

| Frequency | 124 Hz | 160 Hz | 200 Hz | 248 Hz | 316 Hz | 400 Hz | 500 Hz |
|---|---|---|---|---|---|---|---|
| Example 1 (α/GSM) | NA | NA | NA | NA | NA | NA | NA |
| Example 2 (α/GSM) | 1.5E−05 | 2.0E−05 | 3.6E−05 | 4.7E−05 | 5.2E−05 | 5.6E−05 | 5.8E−05 |
| Example 3 (α/GSM) | 1.9E−05 | 2.5E−05 | 4.5E−05 | 5.5E−05 | 6.1E−05 | 6.4E−05 | 6.7E−05 |
| Example 4 (α/GSM)* | 5.9E−06 | 7.4E−06 | 9.1E−06 | 1.0E−05 | 1.2E−05 | 1.5E−05 | 1.8E−05 |
| Example 5 (α/GSM) | 1.4E−05 | 1.7E−05 | 2.8E−05 | 3.2E−05 | 3.3E−05 | 3.3E−05 | 3.3E−05 |

TABLE 4-continued

| | | | | | | | |
|---|---|---|---|---|---|---|---|
| Example 6 (α/GSM) | 1.2E−05 | 1.2E−05 | 2.2E−05 | 3.9E−05 | 4.9E−05 | 5.0E−05 | 5.2E−05 |
| Example 7 (α/GSM) | 1.6E−05 | 1.7E−05 | 2.6E−05 | 3.3E−05 | 4.1E−05 | 4.7E−05 | 5.1E−05 |
| Example 8 (α/GSM) | 1.5E−05 | 1.6E−05 | 2.1E−05 | 2.7E−05 | 3.3E−05 | 3.6E−05 | 4.0E−05 |
| Example 9 (α/GSM) | 2.4E−05 | 2.9E−05 | 4.5E−05 | 5.5E−05 | 6.2E−05 | 6.6E−05 | 6.9E−05 |
| Comp. Ex. C1 (α/GSM) | 3.7E−06 | 3.6E−06 | 5.0E−06 | 8.0E−06 | 1.2E−05 | 1.5E−05 | 1.8E−05 |
| Comp. Ex. C2 (α/GSM) | 7.4E−06 | 1.7E−05 | 2.8E−05 | 3.0E−05 | 2.7E−05 | 2.7E−05 | 2.7E−05 |
| Comp. Ex. C3 (α/GSM) | 2.3E−05 | 3.1E−05 | 4.7E−05 | 5.6E−05 | 5.7E−05 | 5.3E−05 | 5.3E−05 |
| Frequency | 632 Hz | 800 Hz | 1000 Hz | 1248 Hz | 1600 Hz | 2000 Hz | 2500 Hz |
| Example 1 (α/GSM) | NA | NA | NA | NA | NA | NA | NA |
| Example 2 (α/GSM) | 6.1E−05 | 6.4E−05 | 6.6E−05 | 6.9E−05 | 7.2E−05 | 7.5E−05 | 7.8E−05 |
| Example 3 (α/GSM) | 7.0E−05 | 7.3E−05 | 7.5E−05 | 7.7E−05 | 8.0E−05 | 8.2E−05 | 8.4E−05 |
| Example 4 (α/GSM)* | 2.3E−05 | 2.9E−05 | 3.5E−05 | 4.1E−05 | 4.8E−05 | 5.4E−05 | 6.0E−05 |
| Example 5 (α/GSM) | 3.4E−05 | 3.6E−05 | 3.7E−05 | 3.9E−05 | 4.1E−05 | 4.3E−05 | 4.6E−05 |
| Example 6 (α/GSM) | 5.1E−05 | 5.5E−05 | 5.3E−05 | 5.6E−05 | 5.8E−05 | 6.0E−05 | 6.4E−05 |
| Example 7 (α/GSM) | 5.8E−05 | 6.4E−05 | 6.3E−05 | 6.7E−05 | 7.1E−05 | 7.4E−05 | 7.6E−05 |
| Example 8 (α/GSM) | 4.3E−05 | 4.7E−05 | 5.0E−05 | 5.3E−05 | 5.5E−05 | 5.7E−05 | 6.1E−05 |
| Example 9 (α/GSM) | 7.4E−05 | 7.7E−05 | 7.9E−05 | 8.2E−05 | 8.5E−05 | 8.7E−05 | 9.0E−05 |
| Comp. Ex. C1 (α/GSM) | 2.0E−05 | 2.2E−05 | 2.3E−05 | 2.5E−05 | 2.6E−05 | 2.7E−05 | 2.8E−05 |
| Comp. Ex. C2 (α/GSM) | 2.7E−05 | 2.8E−05 | 2.9E−05 | 3.1E−05 | 3.3E−05 | 3.7E−05 | 4.0E−05 |
| Comp. Ex. C3 (α/GSM) | 5.3E−05 | 6.2E−05 | 5.8E−05 | 6.1E−05 | 6.4E−05 | 6.7E−05 | 6.9E−05 |

*15 mm thick bed

Examples 10-12

Synthesis of Acoustic Filler Agglomerates Containing a Heat-Activated Binder Through Dry Mixing and Fusion into Block and Hammermilling at Lab-Scale Heat-activated polymeric binders and inorganic feed materials were combined by mixing and shaking in a sealed plastic "ZIPLOCK" bag. Half the mixture was poured into an aluminum pan and the other half into a mold with a weighted lid. Both were heated for an hour to activate the binder and fuse the mixture into a composite block. After cooling, the blocks were broken up into pieces by hand and hammermilled using a grinder mill (obtained under the trade designation "MF 10" with a "MF 10.1" cutting-grinding head and a 1.0 mm sieve, all from IKA Works, Inc., Wilmington, NC). Once milled, the agglomerates were classified using two sieves with wire mesh screens (Retsch GmbH, Haan, Germany), the first with larger openings and second with smaller openings. These sieves were placed into the AS 200 sieve shaker, and they were agitated at a setting of 1 mm for 10 minutes. Any agglomerated material that passed through the larger opening screen and was blocked by the smaller opening screen was used for further acoustic testing. The particle compositions and processing conditions are recorded in Table 5.

TABLE 5

| Ex. | Acoustic Particulate Type | Binder Type | Acoustic Particulate wt. % | Binder wt. % | Heating Receptacle | Heating Temperature (° C.) | Sieved Particle Size Cut (microns) |
|---|---|---|---|---|---|---|---|
| 10 | L3S | PE 2126 | 50 | 50 | Closed mold with weighted lid | 200 | 100-300 |
| 11 | L3S | PE 2126 | 50 | 50 | Open aluminum pan | 200 | 200-710 |
| 12 | L3S | 2:1 wt:wt PE 2126/ RP-2 | 25 | 75 | Open aluminum pan | 200 | 100-710 |

Examples 13-15

Synthesis of Acoustic Filler Agglomerates Containing a Heat-Activated Binder Through High Shear Mixing at Lab-Scale Prior to use, PU binder was cryogenically ground to an average particle size of 140 microns. Dry binder and acoustic particulate were combined at the designated ratios by mixing and shaking in a plastic "ZIPLOCK" bag. Particle agglomeration was performed in a food processor (obtained under the trade designation "3-CUP DLC-2A MINI-PREP PLUS" from Cuisinart Appliances, East Windsor, NJ) through addition of water and high shear. During addition of the water, the material was periodically broken up using a spatula to ensure uniform distribution. After mixing, the agglomerates were heated at 50-60° C. overnight for drying and then heated for an hour at a higher temperature to activate the binder. In some cases, the elevated temperature heating and subsequent cooling was done under vacuum conditions. The agglomerates were classified using two sieves with wire mesh screens (Retsch GmbH, Haan, Germany), the first with 710 micron openings and second with 100 micron openings. These sieves were placed into the AS 200 sieve shaker, and they were agitated at a setting of 1 mm for 10 minutes. Any agglomerated material that passed through the 710 micron screen and was blocked by the 100 micron screen was used for further acoustic testing. The particle compositions and processing conditions are recorded in Table 6.

TABLE 6

| Ex | Acoustic Particulate Type | Polymer Binder | Other Binder | Acoustic Particulate (wt. % in Dry Mixture) | Polymer Binder (wt. % in Dry Mixture) | Other Binder (wt. % in Dry Mixture) | DI Water (wt. % in Wetted Mixture) | Fusion Heating Temperature (° C.) |
|---|---|---|---|---|---|---|---|---|
| 13 | NP1 | PE 2126 | NA | 50 | 50 | 0 | 50 | 150 |
| 14 | L3S | PU | NA | 50 | 50 | 0 | 57 | 150 (vac) |
| 15 | L3S | PE 2126 | RP-2 | 50 | 33 | 17 | 59 | 150 (vac) |

Figure 2:
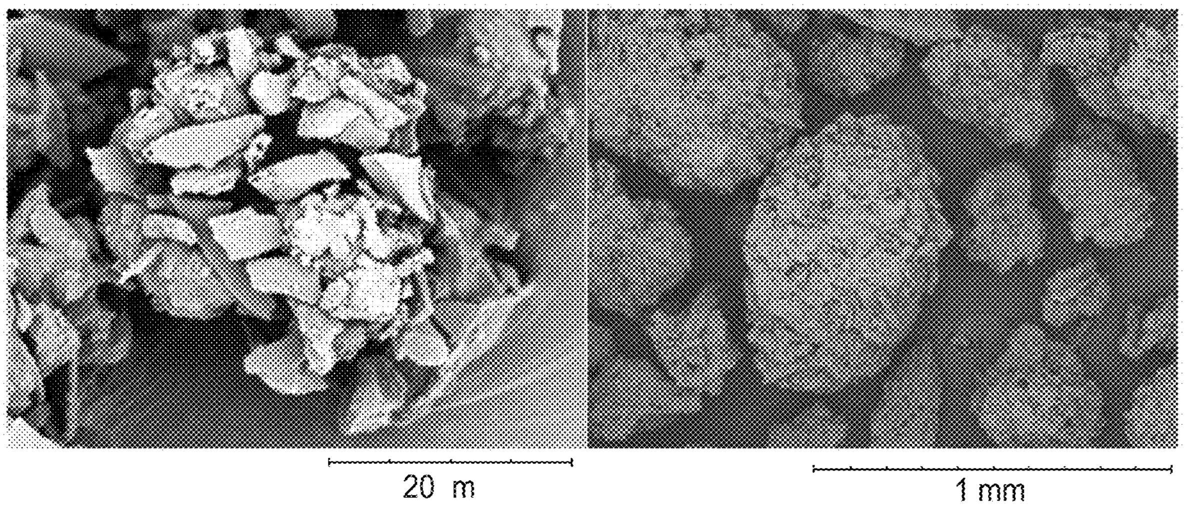
FIG. 2 is SEM image of acoustic articles of current application.

Characterization of Acoustic Filler Agglomerates Containing Heat-Activated Binder Examples 10-15 were analyzed using Sieved Particle Size Analysis, Gas Sorption Analysis, Bulk Density testing, and Skeletal Density testing. Results are shown in Table 7. Relevant parameters calculated from the QSDFT model were used to analyze the nitrogen sorption isotherms are shown. MBET and pore volume measurements were made as previously described and are also shown. Table 8 lists observations of the morphology of some of the Examples via SEM analysis. FIG. 2 shows Ex. 11 (at left) and Ex. 15 (at right). Normal incidence acoustic absorption for the Examples in the 20 mm packed bed configuration is reported in Table 9. The absorption was also normalized by the grammage (GSM) of the packed bed placed in the impedance tube and is reported in Table 10.

TABLE 7

| Ex. | 100-200 μm (wt %) | 200-300 μm (wt %) | 300-400 μm (wt %) | 400-500 μm (wt %) | 500-600 μm (wt %) | 600-710 μm (wt %) | Total Pore Volume (mL/g) | Surface Area, MBET | Micropore Surface Area, DFT ($m^2/g$) | Bulk Density (g/cc) | Skeletal Density (g/cc) |
|---|---|---|---|---|---|---|---|---|---|---|---|
| 10 | 55 | 42 | 3 | 0 | 0 | 0 | 0.19 | 250 | 256 | 0.085 | 1.15 |
| 11 | 96 | 4 | 0 | 0 | 0 | 0 | 0.25 | 316 | 323 | 0.085 | 1.13 |
| 12 | 38 | 51 | 11 | 0 | 0 | 0 | 0.17 | 240 | 246 | 0.16 | 1.12 |
| 13 | 25 | 34 | 38 | 3 | 0 | 0 | 0.15 | 310 | 358 | 0.11 | 1.13 |
| 14 | 21 | 25 | 19 | 13 | 11 | 7 | 0.10 | 136 | 143 | 0.21 | 1.06 |
| 15 | 17 | 11 | 13 | 15 | 22 | 13 | 0.44 | 485 | 478 | 0.25 | 1.64 |

TABLE 8

| Ex. | Preparation Method | Description of Particles from SEM |
|---|---|---|
| 11 | Dry mixing and fusion into block and hammermilling | Irregular, angular particles, with L3S and PE 2126 loosely bound together. Large voids on the order of 50 microns or greater were seen between constituent contact points. |
| 13 | High shear agglomeration | Irregular, angular particles, with NP1 and PE 2126 loosely bound together. Large voids on the order of 50 microns or greater were seen between constituent contact points. |

TABLE 8-continued

| Ex. | Preparation Method | Description of Particles from SEM |
|---|---|---|
| 14 | High shear agglomeration | Irregular, somewhat spheroidal particles. Individual PU pieces obscured by coatings of L3S fines. Large voids on the order of 50 microns or greater were seen. |
| 15 | High shear agglomeration | Irregular, somewhat spheroidal particles. Largely clay and L3S seen on the particle surfaces. Voids on the order of 50 microns or greater were seen. |

TABLE 9

| Frequency | 124 Hz | 160 Hz | 200 Hz | 252 Hz | 316 Hz | 400 Hz | 500 Hz | 632 Hz | 800 Hz | 1000 Hz | 1248 Hz | 1600 Hz | 2000 Hz | 2500 Hz |
|---|---|---|---|---|---|---|---|---|---|---|---|---|---|---|
| Example 10 (α) | 0.05 | 0.06 | 0.08 | 0.13 | 0.20 | 0.30 | 0.40 | 0.50 | 0.60 | 0.67 | 0.73 | 0.77 | 0.80 | 0.81 |
| Example 11 (α) | 0.06 | 0.07 | 0.09 | 0.14 | 0.19 | 0.27 | 0.36 | 0.48 | 0.61 | 0.73 | 0.83 | 0.89 | 0.92 | 0.91 |
| Example 12 (α) | 0.05 | 0.06 | 0.09 | 0.12 | 0.17 | 0.25 | 0.33 | 0.43 | 0.54 | 0.64 | 0.72 | 0.78 | 0.82 | 0.83 |
| Example 13 (α) | 0.04 | 0.06 | 0.08 | 0.10 | 0.14 | 0.19 | 0.26 | 0.34 | 0.46 | 0.57 | 0.69 | 0.81 | 0.89 | 0.93 |
| Example 14 (α) | 0.06 | 0.08 | 0.13 | 0.18 | 0.25 | 0.34 | 0.43 | 0.53 | 0.63 | 0.71 | 0.76 | 0.80 | 0.82 | 0.81 |
| Example 15 (α) | 0.09 | 0.15 | 0.28 | 0.41 | 0.51 | 0.56 | 0.57 | 0.57 | 0.57 | 0.57 | 0.57 | 0.58 | 0.59 | 0.62 |

TABLE 10

| Frequency | 124 Hz | 160 Hz | 200 Hz | 252 Hz | 316 Hz | 400 Hz | 500 Hz |
|---|---|---|---|---|---|---|---|
| Example 10 (α) | 2.9E−05 | 3.5E−05 | 4.6E−05 | 7.5E−05 | 1.2E−04 | 1.7E−04 | 2.3E−04 |
| Example 11 (α) | 3.0E−05 | 3.5E−05 | 4.5E−05 | 7.0E−05 | 9.6E−05 | 1.4E−04 | 1.8E−04 |
| Example 12 (α) | 1.5E−05 | 1.8E−05 | 2.8E−05 | 3.7E−05 | 5.2E−05 | 7.6E−05 | 1.0E−04 |
| Example 13 (α) | 2.0E−05 | 3.0E−05 | 4.0E−05 | 4.9E−05 | 6.9E−05 | 9.4E−05 | 1.3E−04 |
| Example 14 (α) | 1.3E−05 | 1.7E−05 | 2.8E−05 | 3.9E−05 | 5.4E−05 | 7.4E−05 | 9.3E−05 |
| Example 15 (α) | 1.8E−05 | 3.1E−05 | 5.7E−05 | 8.4E−05 | 1.0E−04 | 1.1E−04 | 1.2E−04 |

| Frequency | 632 Hz | 800 Hz | 1000 Hz | 1248 Hz | 1600 Hz | 2000 Hz | 2500 Hz |
|---|---|---|---|---|---|---|---|
| Example 10 (α) | 2.9E−04 | 3.5E−04 | 3.9E−04 | 4.2E−04 | 4.4E−04 | 4.6E−04 | 4.7E−04 |
| Example 11 (α) | 2.4E−04 | 3.1E−04 | 3.7E−04 | 4.2E−04 | 4.5E−04 | 4.6E−04 | 4.6E−04 |
| Example 12 (α) | 1.3E−04 | 1.7E−04 | 2.0E−04 | 2.2E−04 | 2.4E−04 | 2.5E−04 | 2.5E−04 |
| Example 13 (α) | 1.7E−04 | 2.3E−04 | 2.8E−04 | 3.4E−04 | 4.0E−04 | 4.4E−04 | 4.6E−04 |
| Example 14 (α) | 1.1E−04 | 1.4E−04 | 1.5E−04 | 1.6E−04 | 1.7E−04 | 1.8E−04 | 1.8E−04 |
| Example 15 (α) | 1.2E−04 | 1.2E−04 | 1.2E−04 | 1.2E−04 | 1.2E−04 | 1.2E−04 | 1.3E−04 |

Examples 16 and 17

Synthesis of Acoustic Filler Agglomerates Through Eirich Intensive High Shear Agglomeration (Batch Process)

A set of agglomerates were prepared using a batch mixer (obtained under the trade designation “INTENSIVE MIXER MODEL RV02E” from Maschinenfabrik Gustav Eirich GmbH & Co KG, Hardheim, DE). Relevant parameters are shown in Table 11. Initially, the solid feeds were added to the mixing pan and dry mixed at a low rotation speed. Once mixed, the diluted binder suspension was added via a port above the mixing pan at a setting of 15 RPM for both the pan and mixing head. Then, the mixture was mixed for 5 min at 60 RPM for rotor and pan motor speed. The mixture was stirred and re-mixed for 5 min at 60 RPM for rotor and pan motor speed and the rotor spun counter-clockwise for this step (rotation could be clockwise or counter-clockwise for other steps). The obtained sample was dried in shallow aluminum trays in an oven at 70° C. for 12-24 hours.

Once dried, the agglomerates of Ex. 16 were classified using two sieves with wire mesh screens (Retsch GmbH, Haan, Germany), the first with 1000 micron openings and second with 100 micron openings. Any agglomerated material that passed through the 1000 micron screen and was blocked by the 100 micrometer screen was used for further acoustic testing. The agglomerates of Ex. 17 were classified using two sieves with wire mesh screens (Retsch GmbH, Haan, Germany), the first with 710 micron openings and second with 100 micron openings. These sieves were placed into a Retsch AS 200 sieve shaker, and they were agitated at a setting of 1 mm for 10 minutes. Any agglomerated material that passed through the 710 micron screen and was blocked by the 100 micrometer screen was used for further acoustic testing. Additionally, the oversize particles were hammer-milled using an IKA MF 10 grinder mill. The crushed fragments of Ex. 17 were then classified using two sieves with wire mesh screens (Retsch GmbH, Haan, Germany), the first with 710 micron openings and second with 100 micron openings. These sieves were placed into a Retsch AS 200 sieve shaker, and they were agitated at a setting of 1 mm for 10 minutes. Any material that passed through the 710 micron screen and was blocked by the 100 micrometer screen was mixed into the non-milled, in-range component of Ex. 17 and used for further acoustic testing.

TABLE 11

| | | Wood-Based | Coconut-Based | | Solvent/Binder | |
|---|---|---|---|---|---|---|
| Agglomerate | Ex. | Carbon L3S (g) | Carbon NP1 (g) | Clay RP-2 (g) | Rhoplex VSR-50 (g) | Water (g) |
| L3S:RP-2 25:75 | 16 | 500 | 0 | 1500 | 179 | 550 |
| NP1:RP-2 8:92 | 17 | 0 | 240 | 2760 | 600 | 400 |

Examples 18 and 19

Synthesis of Acoustic Filler Agglomerates Through High Shear Pin Agglomeration (Continuous)

Two types of engineered activated carbon-clay composite particles were prepared using a pin mixer (obtained under the trade designation "8D32L" from Mars Mineral, Mars, PA) that had a connected recirculating bath for binder delivery, also obtained from Mars Mineral. Trials were conducted using water or a blend of "N" sodium silicate and water to bind the feed materials. A premixed feed of L3S activated carbon and RP-2 clay was fed into the mixer at a specified rate. Parameters for the runs are given in Table 12. Materials were dried at 120° C. in an oven (obtained under the trade designation "FISHERBRAND ISOTEMP" from Thermo Fisher Scientific, Waltham, MA) to a moisture content under 2%.

Sieving was done using a 1 foot by 3 foot (0.30 m by 0.91 m) vibratory screener (obtained under the trade designation "SMICO DH2" from Southwest Mining and Industrial Company, Valley Brook, OK) outfitted with screens having 150 micron and 650 micron openings. Any agglomerated material that passed through the 650 micron screen and was blocked by the 150 micrometer screen was used for further acoustic testing.

TABLE 12

| Agglomerate | Ex. | L3S (feed %) | RP-2 (feed %) | Feed Rate (lb/min) (kg/min) | Power Usage (hp) (W) | Liquid Pressure (psi) (kPa) | Addition Rate (lb/min) (kg/min) | Binder Content (%) |
|---|---|---|---|---|---|---|---|---|
| L3S:RP-250:50, Water | 18 | 50 | 50 | 1.8 (0.82) | 12.4 (9250) | 30 (210) | 1.001 (0.45) | NA |
| L3S:RP-2 50:50, N Silicate | 19 | 50 | 50 | 1.8 (0.82) | 11.3 (8430) | 31 (210) | 1.043 (0.47) | 5.4 |

Eirich Intensive High Shear Agglomeration and Pin Agglomeration Acoustic Filler Characterization Examples 16-19 were analyzed using Gas Sorption Analysis, Bulk Density testing, Skeletal Density testing, and Thermogravimetric Analysis, Results are shown in Table 13. Relevant parameters calculated from the QSDFT model used to analyze the nitrogen sorption isotherms are shown along with the MBET surface area. Normal incidence acoustic absorption for the Examples in the 20 mm packed bed configuration is reported in Table 14. The absorption was also normalized by the grammage (GSM) of the packed bed placed in the impedance tube and is reported in Table 15.

TABLE 13

| | | Density Measurements | | Surface Area/Pore Volume Characterization | | | | TGA |
|---|---|---|---|---|---|---|---|---|
| Agglomerate | Ex. | Bulk Density (g/mL) | Skeletal Density (g/mL) | Surface Area (MBET, $N_2$, 77K, $m^2/g$) | Micropore Volume (DFT $N_2$, 77K, mL/g) | Micropore Surface Area (DFT $N_2$, 77K, $m^2/g$) | Pore Volume ($N_2$, 77K, mL/g) | Activated Carbon Content (%) |
| L3S:RP-2 25:75 | 16 | 0.38 | 2.31 | 236 | 0.08 | 212 | 0.34 | NT |
| NP1:RP-2 8:92 | 17 | 0.55 | 2.05 | 73 | 0.02 | 64 | 0.20 | NT |
| L3S:RP-2 50:50, Water | 18 | 0.58 | 2.24 | 516 | 0.17 | 458 | 0.53 | 46.3 |
| L3S:RP-2 50:50, N Silicate | 19 | 0.45 | 2.12 | 480 | 0.16 | 458 | 0.49 | NA* |

*Silica content precludes calculation.

TABLE 14

| Frequency | 124 Hz | 160 Hz | 200 Hz | 248 Hz | 316 Hz | 400 Hz | 500 Hz | 632 Hz | 800 Hz | 1000 Hz | 1248 Hz | 1600 Hz | 2000 Hz | 2500 Hz |
|---|---|---|---|---|---|---|---|---|---|---|---|---|---|---|
| Example 16 (α) | 0.07 | 0.09 | 0.12 | 0.16 | 0.22 | 0.27 | 0.32 | 0.42 | 0.42 | 0.46 | 0.50 | 0.54 | 0.56 | 0.58 |
| Example 17 (α) | 0.08 | 0.11 | 0.11 | 0.16 | 0.25 | 0.29 | 0.30 | 0.32 | 0.33 | 0.35 | 0.37 | 0.40 | 0.42 | 0.44 |
| Example 18 (α) | 0.17 | 0.20 | 0.29 | 0.37 | 0.43 | 0.48 | 0.52 | 0.56 | 0.59 | 0.60 | 0.62 | 0.63 | 0.64 | 0.65 |
| Example 19 (α) | 0.09 | 0.20 | 0.54 | 0.47 | 0.37 | 0.35 | 0.35 | 0.38 | 0.42 | 0.43 | 0.45 | 0.49 | 0.51 | 0.54 |

TABLE 15

| Frequency | 124 Hz | 160 Hz | 200 Hz | 248 Hz | 316 Hz | 400 Hz | 500 Hz |
|---|---|---|---|---|---|---|---|
| Example 16 (α/GSM) | 7.4E−06 | 8.3E−06 | 1.0E−05 | 1.2E−05 | 1.5E−05 | 1.9E−05 | 2.3E−05 |
| Example 17 (α/GSM) | 4.3E−06 | 5.9E−06 | 5.9E−06 | 8.6E−06 | 1.3E−05 | 1.6E−05 | 1.6E−05 |
| Example 18 (α/GSM) | 1.6E−05 | 1.8E−05 | 2.7E−05 | 3.4E−05 | 4.0E−05 | 4.4E−05 | 4.8E−05 |
| Example 19 (α/GSM) | 9.5E−06 | 2.1E−05 | 5.7E−05 | 5.0E−05 | 3.9E−05 | 3.7E−05 | 3.7E−05 |

| Frequency | 632 Hz | 800 Hz | 1000 Hz | 1248 Hz | 1600 Hz | 2000 Hz | 2500 Hz |
|---|---|---|---|---|---|---|---|
| Example 16 (α/GSM) | 2.8E−05 | 3.4E−05 | 4.0E−05 | 4.5E−05 | 4.9E−05 | 5.1E−05 | 5.1E−05 |
| Example 17 (α/GSM) | 1.7E−05 | 1.8E−05 | 1.9E−05 | 2.0E−05 | 2.2E−05 | 2.3E−05 | 2.4E−05 |
| Example 18 (α/GSM) | 5.1E−05 | 5.4E−05 | 5.5E−05 | 5.7E−05 | 5.8E−05 | 5.9E−05 | 6.0E−05 |
| Example 19 (α/GSM) | 4.0E−0 | 4.4E−05 | 4.5E−05 | 4.8E−05 | 5.2E−05 | 5.4E−05 | 5.7E−05 |

Preparatory Example P1, Example 20, and Comparative Example C4

Spray Drying

A spray dryer (obtained under the trade designation "NIRO MOBIL MINOR" from GEA Group AG, Düsseldorf, Germany) was used for spray drying. The slurry was prepared for spray drying by dispersing L3S activated carbon and RP-2 kaolin into DI water, at 10 wt. % for each component. The material was spray-dried with an outlet temperature of 90° C., air atomization pressure of 30 psi (207 kPa), and a feed rate of about 2 kg/hr. The particle size distribution of the output material (Preparatory Example P1) is shown in Table 16.

Fluidized Bed Agglomeration of Preparatory Example P1 to Produce Acoustic Filler Agglomerates A fluid bed dryer (obtained under the trade designation "VECTOR FL-M-1" from Freund-Vector Corporation, Marion, Iowa) was used for agglomeration of the Preparatory Example P1 spray dried particles. The top-down liquid spray addition was carried out with an air atomization pressures of 8 psi (55 kPa), pump rates of 1.2-1.5 kg/hr, and an air temperature of 45° C. An aqueous solution of 10% STAR sodium silicate was used as the binder system. Binder solution was sprayed onto 250 g batches of the spray-dried powder over the course of 11-20 minutes. Each batch remained fluidized for at least five minutes following spraying to reduce the remaining moisture content. Particle size characteristics (via laser scattering particle size analysis) and process conditions can be found in Table 16 and Table 17.

Characterization of Acoustic Filler Agglomerates via Fluidized Bed Agglomeration Examples underwent Gas Sorption, Bulk Density testing, and Skeletal Density testing as represented in Table 18. Table 19 shows the normal incidence acoustic absorption for the Examples in the 20 mm packed bed configuration. The absorption normalized by the grammage (GSM) of the packed bed placed in the impedance tube is shown in Table 20.

TABLE 16

| Ex. | Dv10 (microns) | Dv50 (microns) | Dv90 (microns) |
|---|---|---|---|
| P1 | 6.2 | 22.7 | 100.3 |
| C4 | 11.7 | 40.1 | 134.5 |
| 20 | 120.2 | 240.3 | 447.3 |

TABLE 17

| Ex. | Binder Type | Binder in solution (%) | Binder added (as % final solids) | Air Atomization Pressure (psi) (kPa) | Pump Rate (kg/hr) | Spray Time (min) |
|---|---|---|---|---|---|---|
| C4 | STAR | 10 | 7.3 | 8 (55) | 1.2 | 11 |
| 20 | STAR | 10 | 18.9 | 8 (55) | 1.5 | 20 |

TABLE 18

| | | Density Measurements | | Surface Area/Pore Volume Characterization | | | |
|---|---|---|---|---|---|---|---|
| Agglomerate | Ex. | Bulk Density (g/mL) | Skeletal Density (g/mL) | Surface Area (MBET, $N_2$, 77K, $m^2/g$) | Micropore Volume (DFT $N_2$, 77K, mL/g) | Micropore Surface Area (DFT $N_2$, 77K, $m^2/g$) | Pore Volume ($N_2$, 77K, mL/g) |
| STAR1 L3S:RP-2 50:50 | C4 | 0.32 | 2.08 | 492 | 0.17 | 476 | 0.42 |
| STAR 2 L3S:RP-2 50:50 | 20 | 0.28 | 2.03 | 401 | 0.14 | 405 | 0.29 |

TABLE 19

| Frequency | 124 Hz | 160 Hz | 200 Hz | 248 Hz | 316 Hz | 400 Hz | 500 Hz | 632 Hz | 800 Hz | 1000 Hz | 1248 Hz | 1600 Hz | 2000 Hz | 2500 Hz |
|---|---|---|---|---|---|---|---|---|---|---|---|---|---|---|
| Comp. Example C4 (α) | 0.07 | 0.13 | 0.68 | 0.53 | 0.23 | 0.18 | 0.22 | 0.33 | 0.39 | 0.31 | 0.30 | 0.29 | 0.31 | 0.33 |
| Example 20 (α) | 0.06 | 0.11 | 0.24 | 0.44 | 0.49 | 0.45 | 0.43 | 0.43 | 0.45 | 0.44 | 0.46 | 0.52 | 0.56 | 0.60 |

TABLE 20

| Frequency | 124 Hz | 160 Hz | 200 Hz | 248 Hz | 316 Hz | 400 Hz | 500 Hz |
|---|---|---|---|---|---|---|---|
| Comp. Example C4 (α) | 1.1E−05 | 2.0E−05 | 1.0E−04 | 8.0E−05 | 3.5E−05 | 2.7E−05 | 3.3E−05 |
| Example 20 (α) | 1.1E−05 | 2.0E−05 | 4.3E−05 | 7.8E−05 | 8.7E−05 | 8.0E−05 | 7.6E−05 |

| Frequency | 632 Hz | 800 Hz | 1000 Hz | 1248 Hz | 1600 Hz | 2000 Hz | 2500 Hz |
|---|---|---|---|---|---|---|---|
| Comp. Example C4 (α) | 5.0E−05 | 5.9E−05 | 4.7E−05 | 4.5E−05 | 4.4E−05 | 4.7E−05 | 5.0E−05 |
| Example 20 (α) | 7.4E−05 | 8.0E−05 | 7.8E−05 | 8.2E−05 | 9.2E−05 | 9.9E−05 | 1.1E−04 |

Examples 21-24 and Comparative Examples C5-C8

Integration into Blown Microfiber (BMF) Nonwovens and Acoustic Testing

A nonwoven melt blown web was prepared by a process similar to that described in Wente, Van A., "Superfine Thermoplastic Fibers" in Industrial Engineering Chemistry, Vol. 48, pages 1342 et seq. (1956), except that a drilled die was used to produce the fibers.

A polypropylene resin ("MF650Y") was extruded through the die into a high velocity stream of heated air which drew out and attenuated polypropylene blown microfibers prior to their solidification and collection. Particles were fed into the stream of polypropylene blown microfibers, according to the method of U.S. Pat. No. 3,971,373 (Braun). The blend of polypropylene blown microfibers and particles was collected in a random fashion on a metal drum, affording a polypropylene BMF-web layer loaded with particles. The web was then removed from the drum to provide the final article. In addition to the loaded web, a sample of the PP base web was taken while the particle loader was turned off. Sample constructions made are detailed in Table 21. Sample thickness, sample basis weight, AFR Test 1 and AFR Test 2 measurements were conducted on the particle-loaded samples and results are recorded in Table 21. Sample Thickness Test 1, sample weight and AFR Test 1 measurements were conducted on the PP base web samples, and from these the EFD of the base PP and wt % particle loading were calculated. The sample construction details are recorded in Table 21. The examples listed in this section also underwent acoustic testing using the ALPHA CABIN as specified by SAE J2883. Results are listed in Table 22.

TABLE 21

| Ex. | Particle | EFD of Base PP web (micron) | Total Basis Weight ($g/m^2$) | Wt. % Particle Loading | Thickness Test 1 (mm) | Thickness Test 2 (mm) | AFR Test 1 (mm H2O) | AFR Test 2 (MKS Rayls) |
|---|---|---|---|---|---|---|---|---|
| C5 | NONE | 6.4 | 539 | 0 | 9.3 | 7.5 | 61 | *4330 |
| C6 | C3 | 6.3 | 750 | 32 | 12.9 | 9.4 | 51 | 3875 |
| C7 | KOWA, 177-250 microns | 5.2 | 738 | 30 | 13.8 | 9.3 | 91 | *6460 |
| C8 | C2 | 4.9 | 763 | 30 | 11.3 | 12.3 | 89 | 3930 |
| Ex. 21 | Ex. 16 | 6.4 | 782 | 31 | 11.9 | 8.8 | 63 | *4475 |
| Ex. 22 | Ex. 17 | 4.8 | 725 | 27 | 7.9 | 7.2** | 110 | 7675 |

TABLE 21-continued

| Ex. | Particle | EFD of Base PP web (micron) | Total Basis Weight (g/m$^2$) | Wt. % Particle Loading | Thickness Test 1 (mm) | Thickness Test 2 (mm) | AFR Test 1 (mm H2O) | AFR Test 2 (MKS Rayls) |
|---|---|---|---|---|---|---|---|---|
| Ex. 23 | Ex. 18 | 4.7 | 773 | 32 | 12.1 | 11.9** | 100 | 5160 |
| Ex. 24 | Ex. 19 | 4.5 | 750 | 33 | 11.7 | 9.4 | 87 | 4810 |

*The measurement was converted to MKS Rayls from the AFR Test 1 value in mm H2O using the linear relationship of AFR [MKS Rayls] = 71.035 × Pressure Drop (in mm H20 measured at 85 LPM).
**Relofted

TABLE 22

| Frequency | 400 Hz | 500 Hz | 630 Hz | 800 Hz | 1000 Hz | 1250 Hz | 1600 Hz | 2000 Hz | 2500 Hz | 3150 Hz | 4000 Hz | 5000 Hz | 6300 Hz | 8000 Hz | 10000 Hz |
|---|---|---|---|---|---|---|---|---|---|---|---|---|---|---|---|
| C5 | 0.11 | 0.26 | 0.40 | 0.63 | 0.82 | 0.90 | 0.93 | 0.94 | 0.96 | 0.91 | 0.92 | 0.90 | 0.92 | 0.95 | 0.93 |
| C6 | 0.03 | 0.06 | 0.12 | 0.24 | 0.48 | 0.76 | 0.87 | 0.89 | 0.89 | 0.81 | 0.82 | 0.81 | 0.83 | 0.83 | 0.86 |
| C7 | 0.07 | 0.27 | 0.47 | 0.77 | 0.93 | 0.97 | 0.93 | 0.91 | 0.91 | 0.88 | 0.89 | 0.88 | 0.91 | 0.91 | 0.93 |
| C8 | 0.21 | 0.53 | 0.88 | 0.99 | 0.93 | 0.91 | 0.84 | 0.82 | 0.82 | 0.83 | 0.82 | 0.83 | 0.87 | 0.91 | 0.88 |
| Ex. 21 | 0.08 | 0.19 | 0.32 | 0.56 | 0.79 | 0.88 | 0.90 | 0.91 | 0.93 | 0.87 | 0.88 | 0.86 | 0.88 | 0.92 | 0.92 |
| Ex. 22 | 0.05 | 0.12 | 0.25 | 0.55 | 0.87 | 0.92 | 0.85 | 0.80 | 0.76 | 0.74 | 0.76 | 0.76 | 0.79 | 0.80 | 0.84 |
| Ex. 23 | 0.17 | 0.43 | 0.74 | 0.99 | 0.95 | 0.92 | 0.85 | 0.85 | 0.84 | 0.82 | 0.85 | 0.83 | 0.85 | 0.86 | 0.90 |
| Ex. 24 | 0.13 | 0.33 | 0.57 | 0.94 | 0.98 | 0.95 | 0.86 | 0.82 | 0.81 | 0.80 | 0.81 | 0.81 | 0.85 | 0.87 | 0.88 |

Comparative Examples C9 and C10—Microperforated Films

Microperforated films were prepared as described in U.S. Pat. No. 6,617,002 (Wood). For C9, a film-grade polypropylene resin PP-1 was used in extrusion of a polypropylene film (1.5 mm thickness) with PP3019 masterbatch added at 3 wt. %. For C10, a film-grade polypropylene resin PP-1 was used in extrusion of a polypropylene film (0.52 mm thickness) with S-57495 masterbatch added. The films were embossed, and heat treated so that the embossing created apertures with different-sized rectangular shaped openings as viewed from the top, where the two principal dimensions are designated $H_t$ and $W_t$, and from the bottom, where the two principal dimensions are designated $H_b$ and $W_b$. The cross section of the aperture as viewed from both the long and short directions was trapezoidal. The dimensions of the apertures, recorded as average values in micrometers (μm), are listed in Table 23.

TABLE 23

| Microperforated Film Aperture Dimensions | | | | | | |
|---|---|---|---|---|---|---|
| Example | $H_t$ (μm) | $H_b$ (μm) | $W_t$ (μm) | $W_b$ (μm) | Thickness (μm) | Hole Density (holes/cm2) |
| C9 | 1900 | 300 | 600 | 260 | 1500 | 65 |
| C10 | 600 | 130 | 200 | 80 | 520 | 630 |

Examples 25 and 26—Microperforated Film Loaded with Particles

Specific size cuts of Example 2 (150-200 micron, 300-400 micron) were used to minimize oversized and undersized particles relative to the film perforation sizes. A portion of Example 2 (less than 100 mL) was classified using 8 in (20.3 cm) diameter round wire mesh screens (obtained from Retsch GmbH, Haan, Germany) having either 300 micron and 400 micron openings or 150 micron and 200 micron openings, by placing the material and the screens into a vibratory sieve shaker (obtained under the trade designation "AS 200" from Retsch GmbH, Haan, Germany), and they were agitated at an amplitude setting of 1 mm for 10 minutes.

Sample discs of C9 and C10 were punched out with a 68 mm diameter punch. For each disc, particles were spread into the larger-aperture side by hand, attempting to fill the apertures to create Ex. 25 and Ex. 26. Sample constructions and the results of Air Flow Resistance (AFR) Test 2 for the control samples are listed. AFR measurements were not performed with the Example 2 particles since their density was low enough to be dislodged from the films, disrupting the measurement. AFR tests were instead conducted with similarly sized but higher-density spherical TORAYCERAM beads, as noted in Table 24.

TABLE 24

| Sample Constructions and Test Results | | | | | | |
|---|---|---|---|---|---|---|
| | Substrate | Particle | Film Basis Wt (GSM) | wt. % Particles | Zirconia Particle Diameters used in AFR Pressure Drop Test (um) | AFR Pressure drop (MKS Rayls) |
| C9 | MF-1 | None | 930 ± 5 | 0 | N/A | 40 |
| Ex. 25 | MF-1 | EX 2 (300-400 um) | 1026 | 9.3 | 500, 300 | 120, 1500 |
| C10 | MF-2 | None | 314 ± 1 | 0 | N/A | 100 |
| Ex. 26 | MF-2 | EX 2 (150-200 um) | 419 | 25 | 200, 100 | 150, 1700 |

Acoustic Testing of Particle Loaded Films

Examples 25 and 26 and Comparative Examples C9 and C10 underwent Normal Incident Acoustical Absorption as applied to loaded films. The results are shown in Table 25.

TABLE 25

Acoustic Test Results on Perforated Film

| Frequency (Hz) | 200 Hz | 250 Hz | 315 Hz | 400 Hz | 500 Hz | 630 Hz | 800 Hz | 1000 Hz | 1250 Hz | 1600 Hz | 2000 Hz | 2500 Hz |
|---|---|---|---|---|---|---|---|---|---|---|---|---|
| Comp. Ex. C9 | 0.04 | 0.03 | 0.03 | 0.03 | 0.05 | 0.07 | 0.1 | 0.15 | 0.23 | 0.37 | 0.5 | 0.58 |
| Ex. 25 | 0.09 | 0.11 | 0.14 | 0.18 | 0.18 | 0.38 | 0.53 | 0.67 | 0.79 | 0.89 | 0.9 | 0.86 |
| Comp. Ex. C10 | 0.06 | 0.05 | 0.04 | 0.05 | 0.07 | 0.1 | 0.14 | 0.2 | 0.29 | 0.41 | 0.54 | 0.66 |
| Ex. 26 | 0.05 | 0.05 | 0.07 | 0.1 | 0.14 | 0.19 | 0.27 | 0.4 | 0.54 | 0.71 | 0.86 | 0.96 |

All references and publications cited herein are expressly incorporated herein by reference in their entirety into this disclosure. Illustrative embodiments of this invention are discussed and reference has been made to possible variations within the scope of this invention. For example, features depicted in connection with one illustrative embodiment may be used in connection with other embodiments of the invention. These and other variations and modifications in the invention will be apparent to those skilled in the art without departing from the scope of the invention, and it should be understood that this invention is not limited to the illustrative embodiments set forth herein. Accordingly, the invention is to be limited only by the claims provided below and equivalents thereof.

What is claimed is:

1. An acoustic absorbing filler, the acoustic absorbing filler being a plurality of particle agglomerates, wherein each of the particle agglomerates comprises a first phase comprising a plurality of porous particulates and a second phase comprising a binder;

wherein the acoustic absorbing filler has a median sieved particle size of from 100 micrometer to 700 micrometers and a specific surface area of from 50 $m^2/g$ to 900 $m^2/g$;

wherein the acoustic absorbing filler has a normal incidence acoustic absorption of no less than 0.20 alpha at 400 Hz.

2. The acoustic absorbing filler of claim 1, wherein the porous particulates are microporous.

3. The acoustic absorbing filler of claim 1, wherein the porous particulates are mesoporous.

4. The acoustic absorbing filler of claim 3, wherein the mesoporous particulates have an average pore size under 30 nm.

5. The acoustic absorbing filler of claim 1, wherein the binder has a specific surface area less than 50 $m^2/g$.

6. The acoustic absorbing filler of claim 1, wherein the binder does not comprise microporous particulate materials.

7. The acoustic absorbing filler of claim 1, wherein the porous particulates comprise porous carbon.

8. The acoustic absorbing filler of claim 7, wherein the porous carbon comprises activated carbon, vermiform carbon, coal, carbonized biomass or mixture thereof.

9. The acoustic absorbing filler of claim 1, wherein the binder comprises a composition selected from clay particles, diatomaceous earth, plant-based filler, non-layered silicates, alkali silicates, unexpanded graphite, polyolefins, halogenated polyolefins, polyacrylates, acrylic-copolymers, polyvinylpyrrolidone, polyvinyl alcohol, acrylamides, stryenic polymers, polyurethanes, butadiene co-polymer, polyethylene glycol, polyethylene oxide, neoprene, cellulosics, biopolymers and combinations thereof.

10. The acoustic absorbing filler of claim 1, wherein the porous particulates are present in an amount of less than 60% by weight relative to the overall weight of acoustic absorbing filler.

11. The acoustic absorbing filler of claim 1, wherein the porous particulates are present in an amount of less than 35% by weight relative to the overall weight of acoustic absorbing filler.

12. The acoustic absorbing filler of claim 1, wherein the first phase is discontinuous.

13. An acoustic article comprising:

a porous layer; and the acoustic absorbing filler of claim 1 at least partially enmeshed in the porous layer, wherein the acoustic article has a flow resistance of from 1000 MKS Rayls to 10,000 MKS Rayls.

14. The acoustic article of claim 13, wherein the porous layer comprises a non-woven fibrous layer having a plurality of fibers, the acoustic absorbing filler at least partially enmeshed in the plurality of fibers.

15. The acoustic article of claim 13, wherein the porous layer comprises a perforated film having a plurality of apertures with an average narrowest diameter of from 30 micrometers to 5000 micrometers, the acoustic absorbing filler extending in a layer across the perforated film.

16. A method of making an acoustic article comprising:

partially enmeshing acoustic absorbing filler of claim 1 into a porous layer, the acoustic absorbing filler having an specific surface area of from 50 $m^2/g$ to 900 $m^2/g$ to increase acoustic absorption of the article for sound frequencies below 1000 Hz.

* * * * *